United States Patent
Chen et al.

(10) Patent No.: US 11,327,237 B2
(45) Date of Patent: May 10, 2022

(54) DISPLAY-ADJACENT OPTICAL EMISSION OR RECEPTION USING OPTICAL FIBERS

(71) Applicant: Apple Inc., Cupertino, CA (US)

(72) Inventors: Tong Chen, Cupertino, CA (US); Mark T. Winkler, San Jose, CA (US); Michael K. McCord, San Francisco, CA (US); Tingjun Xu, San Jose, CA (US); Xianwei Zhao, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/905,664

(22) Filed: Jun. 18, 2020

(65) Prior Publication Data

US 2021/0396935 A1    Dec. 23, 2021

(51) Int. Cl.
*G02B 6/35* (2006.01)
*G02B 6/04* (2006.01)
(Continued)

(52) U.S. Cl.
CPC ........... *G02B 6/3598* (2013.01); *G02B 6/04* (2013.01); *G02B 6/3578* (2013.01);
(Continued)

(58) Field of Classification Search
CPC ...... G02B 6/3598; G02B 6/04; G02B 6/3578; G02B 6/4246; H04B 10/25; H04B 10/40; G06T 7/70; G06T 7/20
(Continued)

(56) References Cited

U.S. PATENT DOCUMENTS

| 5,231,689 A | * | 7/1993 | Reidinger | ................ G02B 6/06 385/147 |
| 6,349,159 B1 | | 2/2002 | Uebbing et al. | |

(Continued)

FOREIGN PATENT DOCUMENTS

| CN | 105531653 | 4/2016 |
| CN | 107180853 | 9/2017 |

(Continued)

OTHER PUBLICATIONS

U.S. Appl. No. 16/376,987, filed Apr. 5, 2019, Yeke Yazandoost et al.

(Continued)

*Primary Examiner* — Jerry M Blevins
(74) *Attorney, Agent, or Firm* — Brownstein Hyatt Farber Schreck, LLP

(57) ABSTRACT

An electronic device includes a housing and a display. The housing defines an interior cavity and includes an optically-transmissive housing component. The display is disposed in the interior cavity and is viewable through the optically-transmissive housing component. An optoelectronic component is disposed in the interior cavity. An optical fiber extends between a first end positioned adjacent the optoelectronic component and a second end positioned adjacent the optically-transmissive housing component. The optical fiber defines a non-linear optical path between the first end and the second end. At least a portion of the optical fiber is laterally offset from a lateral edge of the display.

19 Claims, 15 Drawing Sheets

(51) Int. Cl.
*G02B 6/42* (2006.01)
*H04B 10/40* (2013.01)
*H04B 10/25* (2013.01)
*G06T 7/20* (2017.01)
*G06T 7/70* (2017.01)

(52) U.S. Cl.
CPC .......... *G02B 6/4246* (2013.01); *H04B 10/25* (2013.01); *H04B 10/40* (2013.01); *G06T 7/20* (2013.01); *G06T 7/70* (2017.01)

(58) Field of Classification Search
USPC ....................................................... 385/115
See application file for complete search history.

(56) References Cited

U.S. PATENT DOCUMENTS

| | | |
|---|---|---|
| 6,529,661 B2 | 3/2003 | Kropp |
| 6,556,349 B2 | 4/2003 | Cox et al. |
| 6,586,776 B1 | 7/2003 | Liu |
| 6,910,812 B2 | 6/2005 | Pommer |
| 6,919,681 B2 | 7/2005 | Cok et al. |
| 6,946,647 B1 | 9/2005 | O'Neill et al. |
| 6,948,820 B2 | 9/2005 | Veligdan et al. |
| 7,021,833 B2* | 4/2006 | Loh .................. G02B 6/4214 385/88 |
| 7,444,083 B2 | 10/2008 | Ohashi et al. |
| 7,499,094 B2 | 3/2009 | Kuriyama |
| 7,518,462 B2 | 4/2009 | Kanno et al. |
| 7,706,073 B2 | 4/2010 | Munro |
| RE41,673 E | 9/2010 | Ma |
| 7,842,246 B2 | 11/2010 | Wohlstadter et al. |
| 8,077,393 B2 | 12/2011 | Steenblik |
| 8,305,400 B2 | 11/2012 | Otani |
| 8,603,642 B2 | 12/2013 | Hatwar et al. |
| 8,664,655 B2 | 3/2014 | Lee et al. |
| 8,743,027 B2 | 6/2014 | Wu et al. |
| 8,780,065 B2 | 7/2014 | Ribeiro et al. |
| 9,007,349 B2 | 4/2015 | Tseng |
| 9,064,451 B2 | 6/2015 | Lynch et al. |
| 9,112,043 B2 | 8/2015 | Arai |
| 9,183,779 B2 | 11/2015 | Soto |
| 9,342,181 B2 | 5/2016 | Wyatt et al. |
| 9,530,381 B1 | 12/2016 | Bozarth et al. |
| 9,570,002 B2 | 2/2017 | Sakariya et al. |
| 9,614,168 B2 | 4/2017 | Zhang et al. |
| 9,741,286 B2 | 8/2017 | Sakariya et al. |
| 9,762,329 B2 | 9/2017 | Motohara |
| 9,870,075 B2 | 1/2018 | Han et al. |
| 9,909,862 B2 | 3/2018 | Ansari et al. |
| 10,073,228 B2 | 9/2018 | Polleux et al. |
| 10,079,001 B2 | 9/2018 | Hodges |
| 10,090,574 B2 | 10/2018 | Wu |
| 10,115,000 B2 | 10/2018 | Mackey et al. |
| 10,222,475 B2 | 3/2019 | Pacala |
| 10,290,266 B2 | 5/2019 | Kurokawa |
| 10,331,939 B2 | 6/2019 | He et al. |
| 10,410,037 B2 | 9/2019 | He et al. |
| 10,453,381 B2 | 10/2019 | Kurokawa |
| 10,474,286 B2 | 11/2019 | Bae et al. |
| 10,565,734 B2 | 2/2020 | Bevensee et al. |
| 10,614,279 B2 | 4/2020 | Kim et al. |
| 10,637,008 B2 | 4/2020 | Harada et al. |
| 10,664,680 B2 | 5/2020 | Xu et al. |
| 10,713,458 B2 | 7/2020 | Bhat et al. |
| 10,748,476 B2 | 8/2020 | Zhao et al. |
| 10,809,853 B2 | 10/2020 | Klenkler et al. |
| 10,838,556 B2 | 11/2020 | Yeke Yazdandoost et al. |
| 10,872,222 B2 | 12/2020 | Gao et al. |
| 10,903,901 B2 | 1/2021 | Mitchell |
| 2003/0148391 A1 | 8/2003 | Salafsky |
| 2004/0209116 A1 | 10/2004 | Ren et al. |
| 2005/0094931 A1* | 5/2005 | Yokoyama ........... G02B 6/3578 385/18 |
| 2012/0113357 A1 | 5/2012 | Cheng et al. |
| 2013/0113733 A1 | 5/2013 | Lim et al. |
| 2015/0309385 A1 | 10/2015 | Shu et al. |
| 2017/0270342 A1 | 9/2017 | He et al. |
| 2018/0032778 A1 | 2/2018 | Lang |
| 2018/0323243 A1 | 11/2018 | Wang |
| 2019/0034686 A1 | 1/2019 | Ling et al. |
| 2019/0130155 A1 | 5/2019 | Park |
| 2019/0221624 A1 | 7/2019 | Lin et al. |
| 2019/0293849 A1 | 9/2019 | Du et al. |
| 2019/0379454 A1* | 12/2019 | Mitchell .............. G02B 6/4249 |
| 2020/0051499 A1 | 2/2020 | Chung et al. |
| 2020/0209729 A1 | 7/2020 | Chen et al. |
| 2020/0241138 A1 | 7/2020 | Allen et al. |
| 2020/0265206 A1 | 8/2020 | Chung et al. |
| 2020/0293741 A1 | 9/2020 | Du |
| 2020/0342194 A1 | 10/2020 | Bhat et al. |
| 2021/0014429 A1 | 1/2021 | Alasirnio et al. |
| 2021/0050385 A1 | 2/2021 | Chuang et al. |
| 2021/0064159 A1 | 3/2021 | Yeke Yazdandoost et al. |
| 2021/0089741 A1 | 3/2021 | Yeh et al. |
| 2021/0091342 A1 | 3/2021 | Chen et al. |

FOREIGN PATENT DOCUMENTS

| | | |
|---|---|---|
| CN | 107271404 | 10/2017 |
| CN | 108292361 | 7/2018 |
| CN | 108885693 | 11/2018 |
| CN | 109983471 | 7/2019 |
| DE | 202004002512 | 3/2005 |
| EP | 2463927 | 8/2013 |
| EP | 3171254 | 5/2017 |
| EP | 3404484 | 11/2018 |
| EP | 3438880 | 2/2019 |
| JP | H0642898 | 2/1994 |
| JP | 6127447 | 5/2017 |
| KR | 20050022260 | 3/2005 |
| WO | WO 17/204777 | 11/2017 |
| WO | WO 18/093798 | 5/2018 |
| WO | WO 18/186580 | 10/2018 |
| WO | WO 18/210317 | 11/2018 |

OTHER PUBLICATIONS

U.S. Appl. No. 16/723,850, filed Dec. 20, 2019, Chen et al.
U.S. Appl. No. 16/791,905, filed Feb. 14, 2020, Xiang.
U.S. Appl. No. 16/815,875, filed Mar. 11, 2020, Chen et al.
Gelinck et al., "X-Ray Detector-on-Plastic With High Sensitivity Using Low Cost, Solution-Processed Organic Photodiodes," IEEE, 2015, pp. 1-8.
Garcia de Arquer et al., "Solution-processed semiconductors for next-generation photodetectors," *Nature Reviews—Materials*, 2017, vol. 2, No. 16100, pp. 1-16.
U.S. Appl. No. 17/200,683, filed Mar. 12, 2021, Einzinger et al.
U.S. Appl. No. 16/945,643, filed Jul. 31, 2020, Chuang et al.
U.S. Appl. No. 16/945,174, filed Jul. 31, 2020, Chen et al.
U.S. Appl. No. 17/003,636, filed Aug. 26, 2020, Yeh et al.
U.S. Appl. No. 17/003,732, filed Aug. 26, 2020, Chen et al.
U.S. Appl. No. 17/006,708, filed Aug. 28, 2020, Ran et al.
U.S. Appl. No. 17/028,775, filed Sep. 22, 2020, Yeke Yazdandoost et al.

\* cited by examiner

DISPLAY-ADJACENT OPTICAL EMISSION OR RECEPTION USING OPTICAL FIBERS

FIELD

The described embodiments relate to electronic devices (e.g., smartphones, tablet computers, laptop computers, wearable devices, standalone or wall-mounted display screens, and other devices) having optical emitters, detectors, or transceivers.

BACKGROUND

In some cases, it may be desirable to determine whether an object or user is proximate to a device, to determine the distance between an object or user and a device, or to determine a velocity or acceleration of an object or user with respect to a device. It may also be desirable to capture a two-dimensional (2D) or three-dimensional (3D) image of an object or user that is proximate to a device. In some cases, the 2D or 3D image may be an image of a fingerprint, a face, or a scene in a field of view (FoV). In some cases, it may be useful to wirelessly transmit or receive information between devices. It may also be useful to acquire images or data pertaining to a device's environment. In all of these cases, the measurements, images, or other data may be sensed or acquired optically.

SUMMARY

Embodiments of the systems, devices, methods, and apparatus described in the present disclosure are directed to optical sensing using optical fibers or optical fiber bundles and, in particular, to near-display optical sensing. In accordance with described techniques, an optical emitter, detector, or transceiver may be positioned near, under, or partially under a device's display, and electromagnetic radiation may be emitted and/or detected around the display (e.g., between the display and a bezel) through one or more optical fibers. Due to the availability of very small diameter optical fibers, such a technique enables an optical emitter, detector, or transceiver to emit and/or detect electromagnetic radiation toward/from the front of a device, while maximizing the surface area available for the display. Such a technique may also be used to emit and/or detect electromagnetic radiation through any optically-transmissive component or surface.

In a first aspect, the present disclosure describes an electronic device. The electronic device may include a housing and a display. The housing may define an interior cavity and include an optically-transmissive housing component. The display may be disposed in the interior cavity, and may be viewable through the optically-transmissive housing component. An optoelectronic component may be disposed in the interior cavity. An optical fiber may extend between a first end positioned adjacent the optoelectronic component and a second end positioned adjacent the optically-transmissive housing component. The optical fiber may define a non-linear optical path between the first end and the second end. At least a portion of the optical fiber may be laterally offset from a lateral edge of the display.

In a second aspect, the present disclosure describes another electronic device. The electronic device may include a housing and a display. The housing may define an interior cavity and include an optically-transmissive housing component. The display may be disposed within the interior cavity, and may be viewable through the optically-transmissive housing component. A first optoelectronic component may be disposed within the interior cavity. A first optical fiber bundle may extend between the first optoelectronic component and the optically-transmissive housing component. A second optoelectronic component may be disposed within the interior cavity. A second optical fiber bundle may extend between the first optoelectronic component and the optically-transmissive housing component. A first set of optical fiber ends in the first optical fiber bundle may be spatially multiplexed with a second set of optical fiber ends in the second optical fiber.

In a third aspect, the present disclosure describes yet another electronic device. The device may include an enclosure having an optically-transmissive surface. An optoelectronic component may be housed within the enclosure. An optical fiber bundle may also be housed within the enclosure, and may be configured to route electromagnetic radiation between the optoelectronic component and the optically-transmissive surface. An optical path routing controller may be configured to selectively alter a set of one or more routes of a set of one or more optical paths defined by the optical fiber bundle.

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
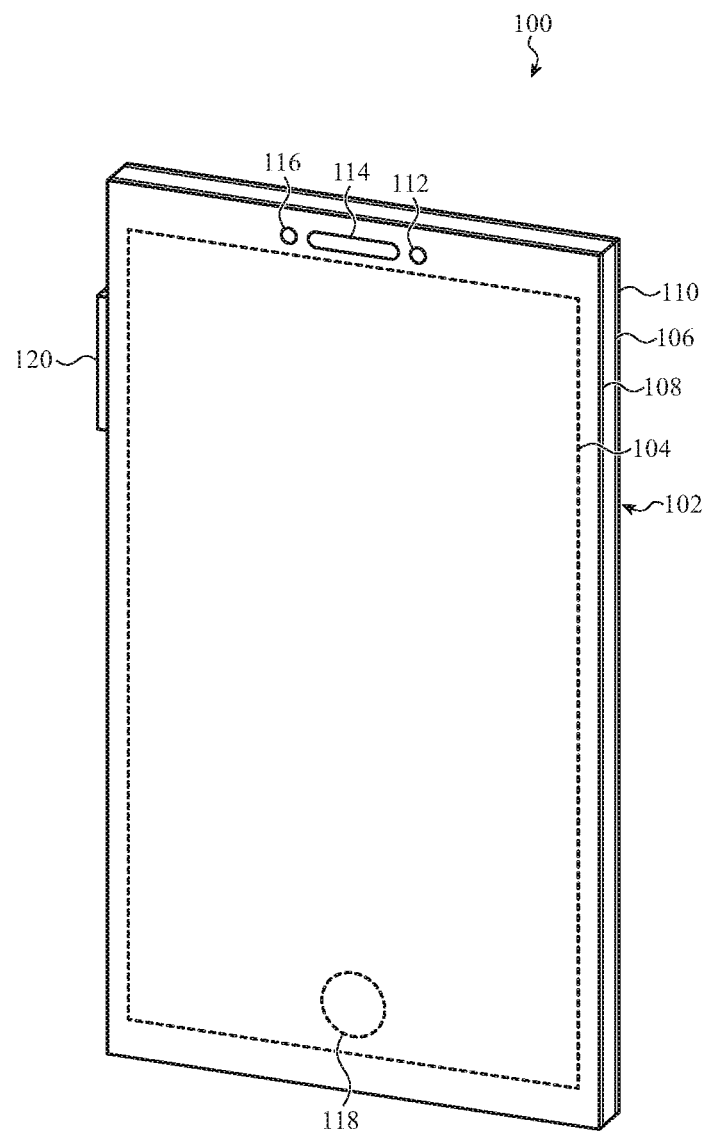
FIGS. 1A and 1B show an example embodiment of a device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof), and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

Electronic devices often include optoelectronic components for providing illumination, sensing the proximity of an object, capturing an image, and so on. In contrast to many solutions that position optoelectronic components under a display and emit or receive electromagnetic radiation through the display (which can result in optical transmission losses of 95-99%), the techniques described herein use optical fibers or optical fiber bundles to route electromagnetic radiation between an optoelectronic component positioned under, partially under, or adjacent a display, to along an edge of the display (e.g., to a gap between the display and a bezel), to an area of an optically-transmissive component or surface. The area of the optically-transmissive component or surface may be adjacent the display or near a perimeter of the display. Electromagnetic radiation may be sensed/detected in a similar manner.

Electromagnetic radiation that is emitted and detected adjacent to a display, using one or more optical fibers, may be much less attenuated than electromagnetic radiation that is emitted or detected through a display. In various described embodiments, the optical fiber(s) can have non-linear routes; can enable sensors with different transmit/receive baselines; can be used in conjunction with an optical emitter, an optical detector, or optical transceiver; can be multiplexed, split, or combined; can be coupled with an optical path routing controller or other element that can steer the optical fiber(s); and so on.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
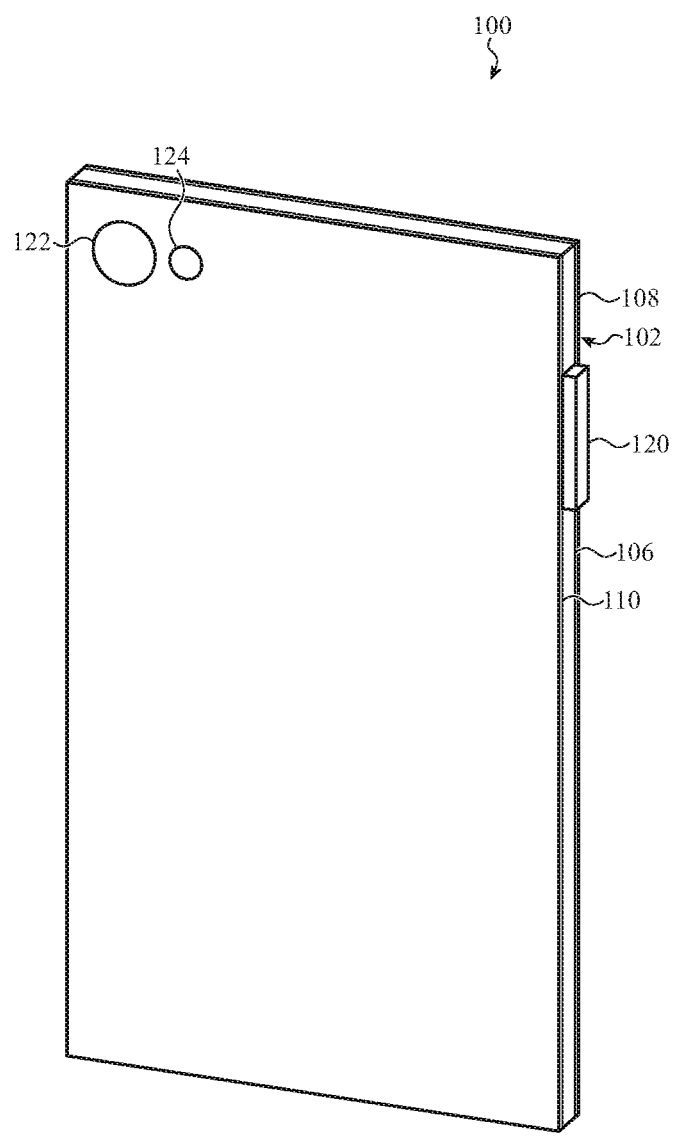

FIGS. 1A and 1B show an example of a device 100. More particularly, FIG. 1A shows an isometric view of the front of the device 100, and FIG. 1B shows an isometric view of the rear of the device 100. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device, including, for example, a mobile phone, tablet computer, laptop computer, portable music player, health monitoring device, wearable device (e.g., an electronic watch or health monitoring device), portable terminal, or other portable or mobile device. The device 100 could also be a device that is semi-permanently 1 located or installed at a single location (e.g., a display screen, security screen, control screen, electronic kiosk display, or television).

The device 100 may include a housing 102 that at least partially surrounds or supports a display 104. In some examples, the housing 102 may include a sidewall 106 that supports a front cover 108 and/or a rear cover 110. The front cover 108 may be positioned over the display 104, and may provide an optically-transmissive surface through which the display 104 may be viewed. In some embodiments, the display 104 may be attached to (or abut) the housing 102 and/or the front cover 108.

The display 104 may include one or more light-emitting elements. For example, the display 104 may include one or more semiconductor light-emitting elements, such as light-emitting diodes (LEDs); one or more semiconductor-driven electroluminescent light-emitting elements, such as OLEDs that include organic materials charged by thin-film transistors (TFTs); or other types of light-emitting elements (e.g., liquid crystal display (LCD) elements, or electroluminescent (EL) display elements). The display 104 may also include, or be associated with, one or more touch and/or force sensors that are configured to detect a touch and/or a force applied to a surface of the front cover 108.

The various components of the housing 102 may be formed from the same or different materials. For example, the sidewall 106 may be formed using one or more metals (e.g., stainless steel), polymers (e.g., plastics), ceramics, or composites (e.g., carbon fiber). In some cases, the sidewall 106 may be a multi-segment sidewall including a set of antennas. The antennas may form structural components of the sidewall 106. The antennas may be structurally coupled (to one another or to other components) and electrically isolated (from each other or from other components) by one or more non-conductive segments of the sidewall 106. The front cover 108 may include, for example, one or more of glass, a crystal (e.g., sapphire), or a transparent polymer (e.g., plastic) that enables a user to view the display 104 through the front cover 108. In some cases, a portion of the front cover 108 (e.g., a perimeter portion of the front cover)

may be coated with an opaque ink to obscure components included within the housing 102. The rear cover 110 may be formed using the same material(s) that are used to form the sidewall 106 or the front cover 108. In some cases, the rear cover 110 may be part of a monolithic element that also forms the sidewall 106 (or in cases where the sidewall 106 is a multi-segment sidewall, those portions of the sidewall 106 that are non-conductive). In still other embodiments, all of the exterior components of the housing 102 may be formed from a transparent material, and components within the device 100 may or may not be obscured by an opaque ink or opaque structure within the housing 102.

The front cover 108 may be mounted to the sidewall 106 to cover an opening defined by the sidewall 106 (i.e., an opening into an interior volume in which various electronic components of the device 100, including the display 104, may be positioned). The front cover 108 may be mounted to the sidewall 106 using fasteners, adhesives, seals, gaskets, or other components.

A display stack or device stack (hereafter referred to as a "stack") including the display 104 may be attached (or abutted) to an interior surface of the front cover 108 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensing system) may be configured to detect a touch applied to an outer surface of the front cover 108 (e.g., to a display surface of the device 100).

In some cases, a force sensor (or part of a force sensing system) may be positioned within the interior volume below and/or to the side of the display 104. In some cases, the force sensor (or force sensing system) may be triggered in response to the touch sensor detecting one or more touches on the front cover 108 (or a location or locations of one or more touches on the front cover 108), and may determine an amount of force associated with each touch, or an amount of force associated with the collection of touches as a whole. Alternatively, operation of the touch sensor (or touch sensing system) may be triggered in response to the force sensor (or force sensing system) detecting an amount of force (e.g., an amount of force exceeding a threshold amount) on the front cover 108. Alternatively, the force sensor (or force sensing system) may be configured to detect a location or centroid of one or more touches, thereby functioning as both a force sensor and a touch sensor.

The front of the device 100 may include one or more front-facing cameras 112, speakers 114, microphones, or other components 116 (e.g., audio, imaging, or sensing components) that are configured to transmit or receive signals to/from the device 100. In some cases, a front-facing camera 112, alone or in combination with other sensors, may be configured to operate as a bio-authentication sensor (e.g., a facial recognition sensor). The device 100 may also include various input devices, including a mechanical or virtual button 118 which may be accessible from the front surface (or display surface) of the device 100. In some cases, the front-facing camera 112, virtual button 118, and/or other sensors of the device 100 may be integrated with a display stack of the device 100 and positioned under the display 104. In some cases, the front-facing camera 112 and/or other sensors of the device 100 may be positioned under, partially under, or adjacent the display 104, and electromagnetic radiation emitted and/or received by the sensor(s) may be routed through a gap (or gaps) adjacent the display 104. An under-display or adjacent optical emitter, detector, or transceiver may also be configured as (or provide) a proximity sensor; a 2D or 3D camera (sometimes in combination with a flood illuminator or structured light source); a bio-authentication sensor (e.g., a facial recognition sensor or fingerprint sensor); an eye/gaze tracker, device tracker, or other optical tracking system; an optical communication system; and so on.

The device 100 may include buttons or other input devices positioned along the sidewall 106 of the housing 102 and/or on a rear surface of the device 100. For example, a volume button or multipurpose button 120 may be positioned along the sidewall 106, and in some cases may extend through an aperture in the sidewall 106.

In some embodiments, the rear surface of the device 100 may include a rear-facing camera 122 that includes a 2D or 3D camera (see, FIG. 1B). A flash or electromagnetic radiation source 124 (e.g., a visible or IR light source) may also be positioned on the rear of the device 100 (e.g., near the rear-facing camera). In some cases, the rear surface of the device 100 may include multiple rear-facing cameras.

Figure 2A:
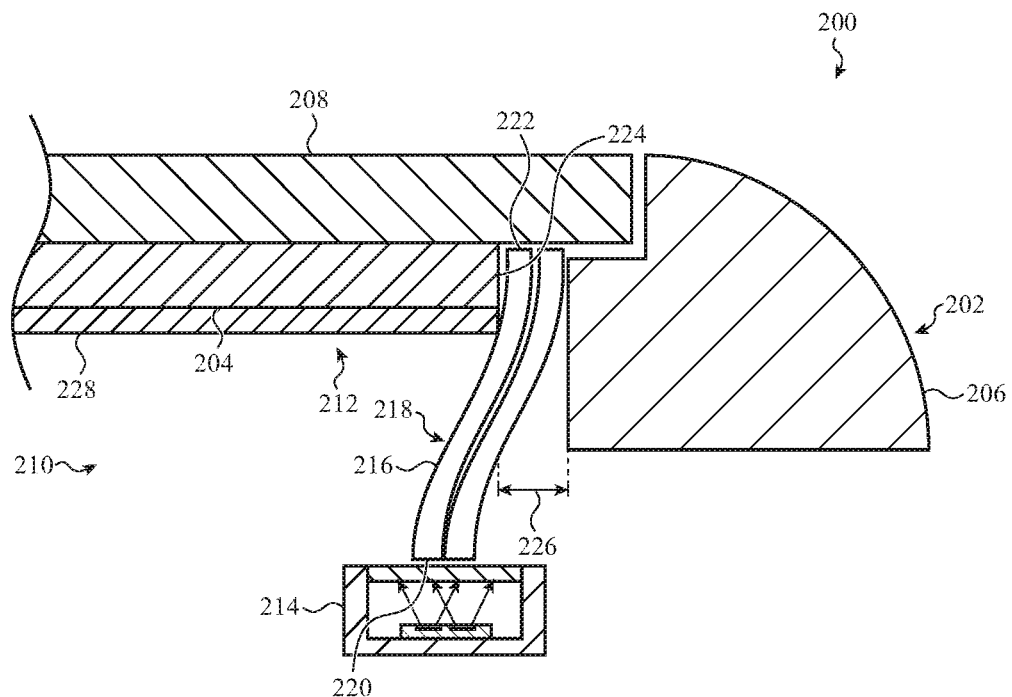
FIGS. 2A-2C show elevations of portions of various example devices.

FIG. 2A shows an elevation of a portion of a device 200. The device 200 may have an enclosure or housing 202 and a display 204. In some embodiments, the device 200 may be the device described with reference to FIGS. 1A-1B.

By way of example, the housing 202 includes at least first and second housing components 206, 208. The first housing component 206 may define a bezel or sidewall around the display 204. The first housing component 206 may have a unitary construction or include a set of housing segments. In some embodiments, the first housing component 206 may include a first subset of conductive housing segments, and a second subset of non-conductive housing segments. The non-conductive housing segments may be disposed between the conductive housing segments and electrically separate at least some of the conductive housing segments from other conductive housing segments. In some cases, some or all of the conductive housing segments may be used by the device 200 as antennas. In other embodiments, the first housing component 206 may be an extension of a housing component that extends under the display 204.

Figure 2B:
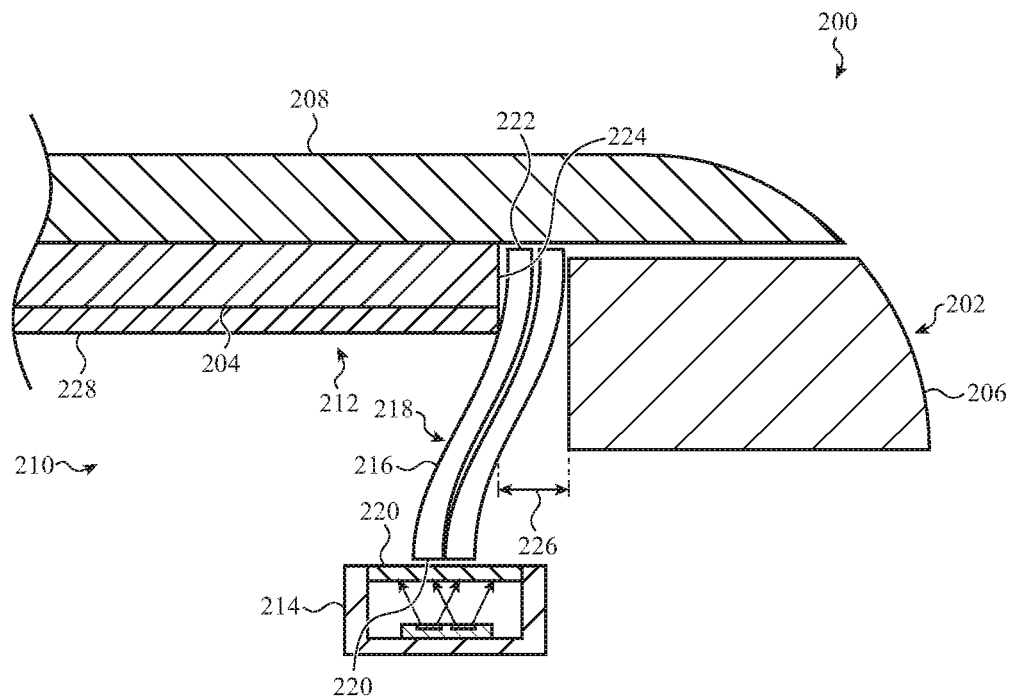

The second housing component 208 may be attached to the first housing component 206 and may cover an opening formed by the first housing component 206. The second housing component 208 may also cover the display 204. The second housing component 208 may be attached to the first housing component 206 by one or more adhesives, gaskets, and/or other components. Although the second housing component 208 is shown to rest on a shelf formed by the first housing component 206, the second housing component 208 may alternately rest on top of the first housing component 206, as shown in FIG. 2B. The second housing component 208 may be an optically-transmissive housing component, and the display 204 may be viewable through the second housing component 208.

The housing 202 (e.g., the first and second housing components 206, 208, alone or in combination with other housing components) may define an interior cavity 210. The display 204 may be disposed in the interior cavity 210. The display 204 may be part of a display stack 212 including one or more layers and/or substrates.

An optoelectronic component 214 may also be disposed in the interior cavity 210. The optoelectronic component 214 may include an optical emitter, an optical detector, or an optical transceiver including both an optical emitter and an optical detector.

An optical fiber 216, or optical fiber bundle 218 including the optical fiber 216, may also be disposed in the interior cavity 210. The optical fiber 216, or optical fiber bundle 218, may extend between a first end 220 positioned adjacent the optoelectronic component 214 (e.g., adjacent an optical port of the optoelectronic component 214) and a second end 222 positioned adjacent the second housing component 208 (i.e., adjacent an optically-transmissive housing component). The first end 220 of the optical fiber 216 or optical fiber bundle 218 may be attached to or positioned adjacent the optoelectronic component 214 or its housing by an optically clear adhesive, or by a mounting frame attached to the optoelectronic component 214 or its housing. Similarly, the second end 222 of the optical fiber 216 or optical fiber bundle 218 may be attached to the second housing component 208 by an optically clear adhesive, or by a mounting frame attached to the second housing component 208. Alternatively, the first end 220 or second end 222 may be positioned adjacent to, but be unattached from, the optoelectronic component 214 or second housing component 208.

The optical fiber 216, and in some cases each optical fiber in the optical fiber bundle 218, may define a non-linear optical path between its first and second ends. At least a portion of the optical fiber 216, or optical fiber bundle 218, may be laterally offset from a lateral edge 224 of the display 204. The at least portion of the optical fiber 216, or optical fiber bundle 218, may also be disposed between the lateral edge 224 of the display 204 and the first housing component 206 (e.g., between the display 204 and a bezel that surrounds the display 204, in a gap 226 (e.g., a bezel gap)). In some cases, at least a portion of the optical fiber 216 or optical fiber bundle 218 may additionally or alternatively be disposed between the lateral edge 224 of the display 204 and an edge of another component or module disposed under the second housing component (or cover) 208 (e.g., a portion of the optical fiber 216 or optical fiber bundle 218 may be disposed between the lateral edge 224 of the display 204 and a lateral edge of a camera component or module). At least a portion of the optical fiber 216 or optical fiber bundle 218 may additionally or alternatively be disposed between the lateral edges of any two components or modules. In some cases, the optical fiber 216 or optical fiber bundle 218 may be additionally or alternatively be disposed against the second housing component (or cover) 208, and extend through a gap between two lateral edges of the display 204.

In some cases, the optoelectronic component 214 may be partly or wholly positioned behind the display 204 or display stack 212, or partly or wholly included in the display stack 212. In these cases, a substrate 228 of the display stack 212 may extend at least partly between the optoelectronic component 214 and the second housing component 208 (i.e., between the optoelectronic component 214 and an optically-transmissive housing component).

As shown, the first and second ends 220, 222 of the optical fiber 216, or optical fiber bundle 218, may not be aligned or may be positioned at non-line-of-sight positions. For example, the first end 220, positioned in a first plane, may not overlap a projection of the second end 222, positioned in a second plane parallel to the first plane. Non-line-of-sight means that a person or machine looking into one end of the optical fiber 216 or optical fiber bundle 218 (e.g., the first end 220) would not see the other end (e.g., the second end 222). In other embodiments, the first and second ends 220, 222 of the optical fiber 216, or optical fiber bundle 218, may have offset or partially non-line-of-sight positions, or aligned or line-of-sight positions.

When the port or ports of an optoelectronic component are coupled with optical fibers, or optical fiber bundles, the optoelectronic component can transmit or receive electromagnetic radiation through or to an area that is dissociated from the size of the optoelectronic component or a module that houses the optoelectronic component. For example, the area through which electromagnetic radiation is transmitted or received may have a different size and/or different shape than a corresponding transmission or reception area of the optoelectronic component or its module. This can provide more freedom for device design, or the ability to position the optoelectronic component outside the line-of-sight of an optically-transmissive housing component (e.g., the optoelectronic component may be positioned behind a display or display stack, where it has no line-of-sight access to the optically-transmissive housing component). Furthermore, and in the case of an optical transceiver, the baseline separation of an optical emitter and optical detector may depend on the routing of the optical fibers, or optical fiber bundles, that are used to direct electromagnetic radiation.

In some embodiments, the second end 222 of the optical fiber 216 or optical fiber bundle 218 may be significantly smaller than the first end 220 of the optical fiber 216 or optical fiber bundle 218, thereby enabling an optoelectronic component or module having a larger aperture size or emission/detection area to transmit or receive electromagnetic radiation from a smaller area, such as between the lateral edge 224 of the display 204 and a bezel defined by the first housing component 206.

The bending of optical fibers or optical fiber bundles, and the selection of optical fiber numerical aperture (NA), can enable an agile fit of optical fibers/fiber bundles that meet desired performance requirements of the optoelectronic component 214.

Figure 2C:
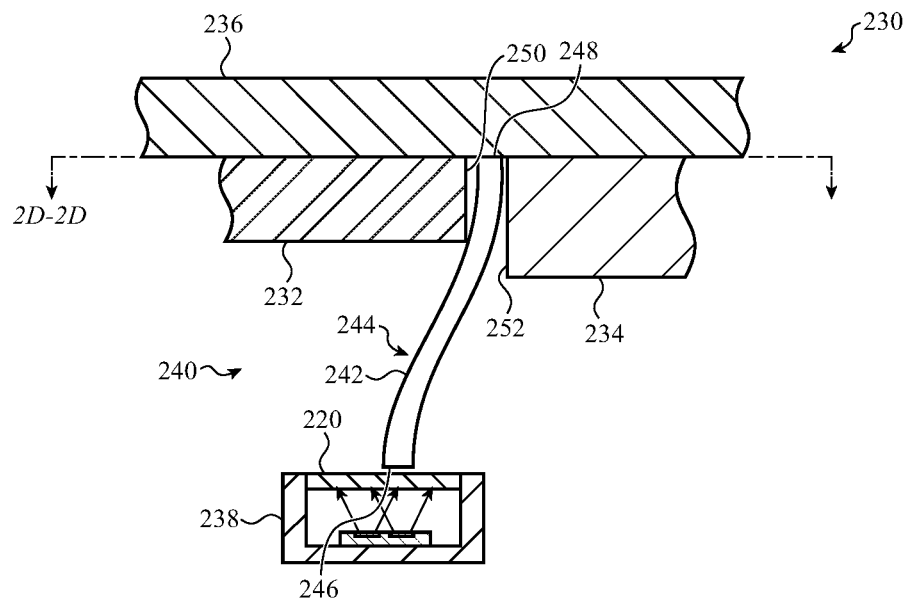
Figure 2D:
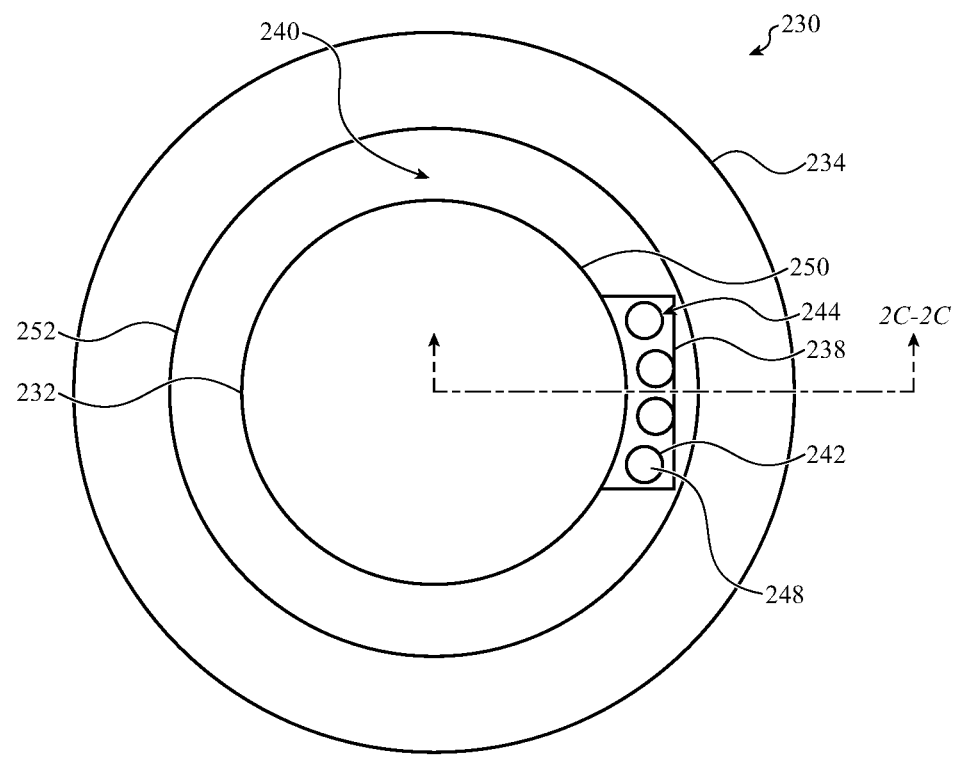
FIG. 2D shows an example plan view of the device portion shown in FIG. 2C.

FIG. 2C shows an example elevation of a portion of a device 230, which device 230 may be the same as, or different from, the device described with reference to FIG. 2A or 2B. FIG. 2D shows an example plan view of the device portion shown in FIG. 2C. The device 230 may have a first component or module 232 and a second component or module 234, cross-sections of which are shown in arbitrary block form in FIG. 2C. The components or modules 232, 234 may take various forms. In some examples, the first component or module 232 may be or include a camera module, and the second component or module 234 may be or include a camera module housing. The camera module housing may support, encircle, and/or shield the camera module. In other examples, the first component or module 232 may be or include a camera module, and the second component or module 234 may be or include a display stack. In other examples, the first component or module 232 may be or include a camera module, and the second component or module 234 may be or include a housing or other structural component (e.g., a midframe or sidewall component of a housing). In other examples, the first component or module 232 may be or include a microphone, speaker, or camera flash module, and the second component or module 234 may be or include another module, a display stack, or a housing or other structural component. The components or modules 232, 234 may also take other forms. In some embodiments, the device 230 may be the device described with reference to FIGS. 1A-1B.

A cover 236 (an optically-transmissive cover) may extend over the first and second components or modules 232, 234. The cover 236 may be attached to and supported by one or both of the components or modules 232, 234, or may be unattached to either of the components or modules 232, 234. In the latter cases, the cover 236 may be attached to and supported by one or more separate housing components (not shown). In some embodiments, one or both of the components or modules 232, 234 may be attached to the cover 236 and suspended from the cover 236 (e.g., into an interior cavity 240 of the device 230).

An optoelectronic component 238 may be disposed within the device 230 (e.g., within the interior cavity 240 of the device 230). The optoelectronic component 238 may include an optical emitter, an optical detector, or an optical transceiver including both an optical emitter and an optical detector.

An optical fiber 242, or optical fiber bundle 244 including the optical fiber 242 (see, FIG. 2D), may also be disposed in the interior cavity 240. The optical fiber 242, or optical fiber bundle 244, may extend between a first end 246 positioned adjacent the optoelectronic component 238 (e.g., adjacent an optical port of the optoelectronic component 238) and a second end 248 positioned adjacent the cover 236. The first end 246 of the optical fiber 242 or optical fiber bundle 244 may be attached to or positioned adjacent the optoelectronic component 238 or its housing by an optically clear adhesive, or by a mounting frame attached to the optoelectronic component 238 or its housing. Similarly, the second end 248 of the optical fiber 242 or optical fiber bundle 244 may be attached to the cover 236 by an optically clear adhesive, or by a mounting frame attached to the cover 236. Alternatively, the first end 246 or second end 248 may be positioned adjacent to, but be unattached from, the optoelectronic component 238 or cover 236.

The optical fiber 242, and in some cases each optical fiber in the optical fiber bundle 244, may define a non-linear optical path between its first and second ends. At least a portion of the optical fiber 242, or optical fiber bundle 244, may be laterally offset from adjacent lateral edges 250, 252 of the first and second components or modules 232, 234. The at least portion of the optical fiber 242, or optical fiber bundle 244, may also be disposed between the lateral edges 250, 252 of the first and second components or modules 232, 234.

In some cases, the optoelectronic component 238 may be partly or wholly positioned behind (or under) the first or second component or module 232, 234.

As shown, the first and second ends 246, 248 of the optical fiber 242, or optical fiber bundle 244, may not be aligned or may be positioned at non-line-of-sight positions. For example, the first end 246, positioned in a first plane, may not overlap a projection of the second end 248, positioned in a second plane parallel to the first plane. In other embodiments, the first and second ends 246, 248 of the optical fiber 242, or optical fiber bundle 244, may have offset or partially non-line-of-sight positions, or aligned or line-of-sight positions.

Figure 3:
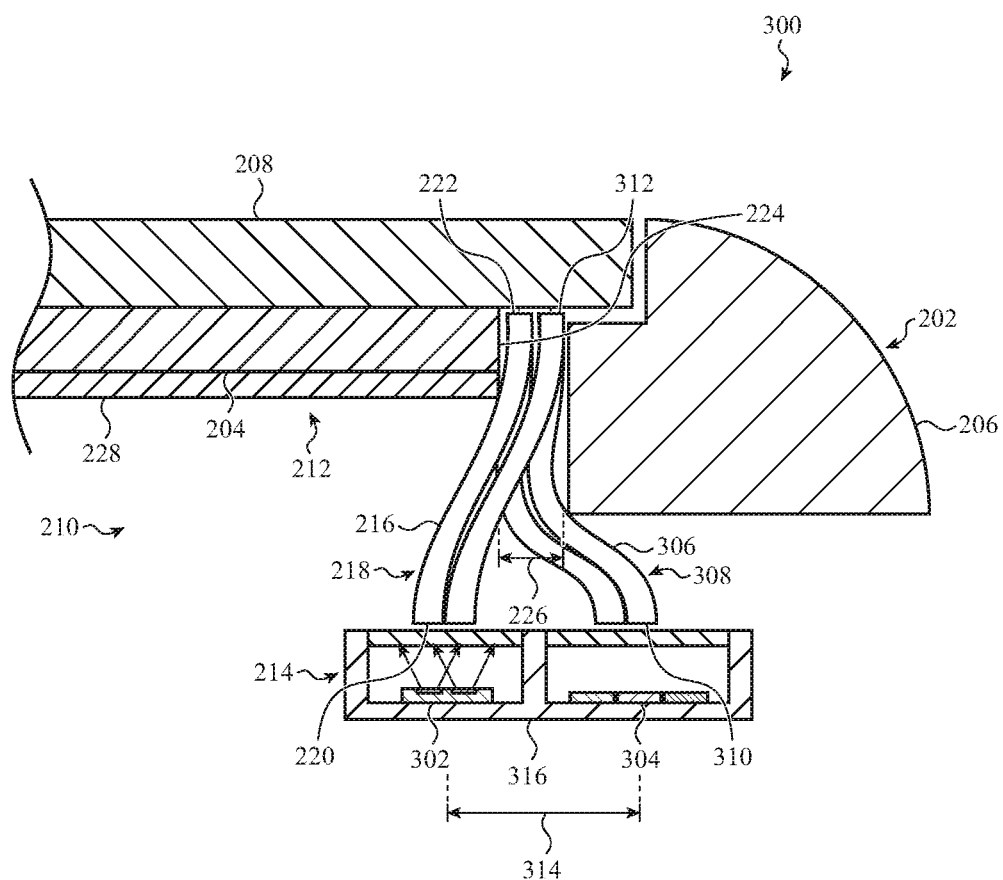
FIGS. 3 and 4 show elevations of portions of various example devices.

FIG. 3 shows an elevation of a portion of a device 300. The device 300 may have an enclosure or housing 202 and a display 204 and may be constructed similarly to the device described with reference to FIG. 2A or 2B. In some embodiments, the device 300 may be the device described with reference to FIGS. 1A-1B.

By way of example, the optoelectronic component 214 included in the device 300 is an optical transceiver and includes an optical emitter 302 and an optical detector 304.

In the device 300, the optical fiber 216 or optical fiber bundle 218 is a first optical fiber or first optical fiber bundle. The first optical fiber 216 or first optical fiber bundle 218 may route electromagnetic radiation emitted by the optical emitter 302 to the second housing component 208 (i.e., to an optically-transmissive housing component).

A second optical fiber 306, or second optical fiber bundle 308 including the second optical fiber 306, may also be disposed in the interior cavity 210. The second optical fiber 306, or second optical fiber bundle 308, may extend between a first end 310 positioned adjacent the optical detector 304 (e.g., adjacent an optical port of the optical detector 304) and a second end 312 positioned adjacent the second housing component 208 (i.e., adjacent an optically-transmissive housing component). The second optical fiber 306 or second optical fiber bundle 308 may route electromagnetic radiation received through the second housing component 208 (an optically-transmissive housing component) to the optical detector 304. The second optical fiber 306, and in some cases each optical fiber in the second optical fiber bundle 308, may define a non-linear optical path between the first end 310 and the second end 312. Similarly to the first optical fiber/fiber bundle, at least a portion of the second optical fiber 306, or second optical fiber bundle 308, may be laterally offset from the lateral edge 224 of the display 204. The at least portion of the second optical fiber 306, or second optical fiber bundle 308, may also be disposed between the lateral edge 224 of the display 204 and the first housing component 206 (e.g., between the display 204 and a bezel that surrounds the display 204, in a gap 226).

The optical emitter 302 and optical detector 304 may have a first baseline separation 314 in a direction transverse to the lateral edges of the display 204 and first housing component 206. The first baseline separation 314 may be dictated by the sizes of the optical emitter 302 and optical detector 304, the configuration of a module 316 or substrate on which the optical emitter 302 and optical detector 304 are mounted, or other factors. The second ends 222, 312 of the first and second optical fibers 216, 306 or optical fiber bundles 218, 308 may have a second baseline separation transverse to the lateral edges of the display 204 and first housing component 206 which, in the example shown, is a "zero" separation (i.e., no separation). Alternatively the second ends 222, 312 may have a second baseline separation, transverse to the lateral edges of the display 204 and first housing component 206, that is the same as, or different from (e.g., less than or greater than) the first baseline separation 314. The optical emitter 302 and optical detector 304 may also have baseline separations in other directions, such as into the page in FIG. 3. Similarly, the second ends 222, 312 may have baseline separations in other directions, such as into the page. These other baseline separations may be the same or different, as dictated by the sizes and placements of the optical emitter 302 and optical detector 304, or as allowed by the lengths and flexibility of the various optical fibers 216, 306 or optical fiber bundles 218, 308.

Figure 4:
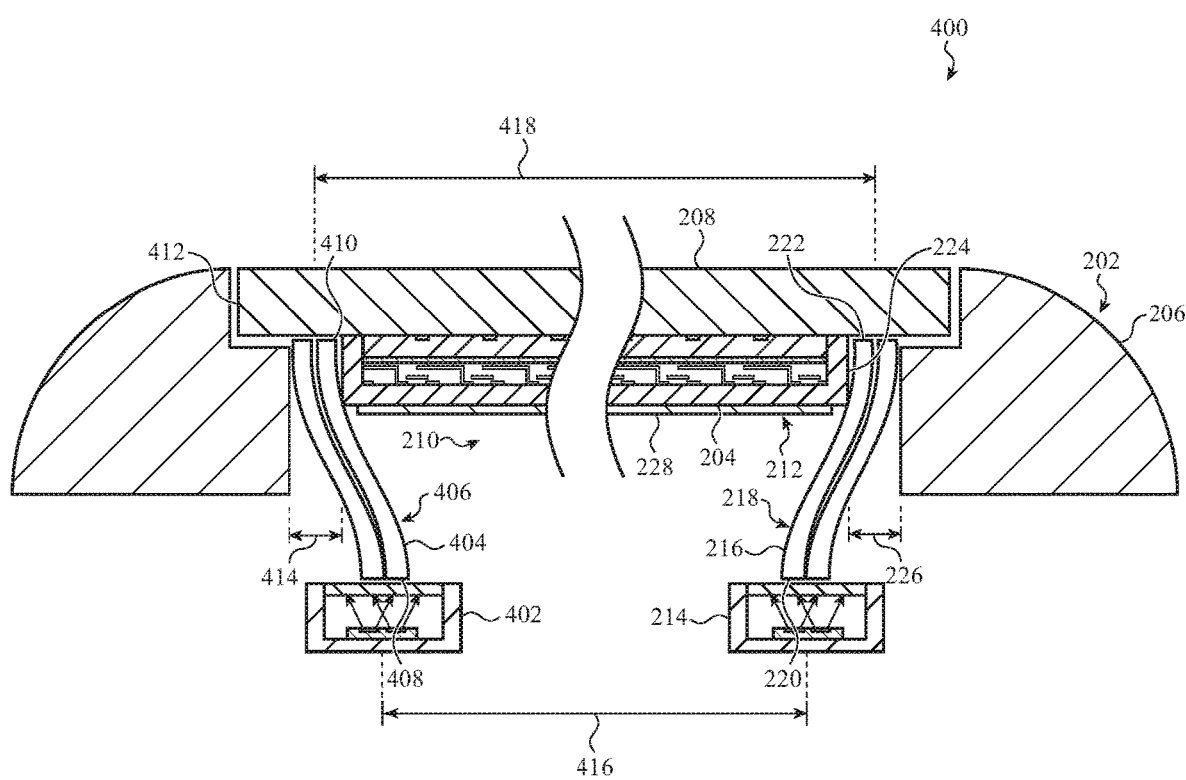

FIG. 4 shows an elevation of a portion of a device 400. The device 400 may have an enclosure or housing 202 and a display 204 and may be constructed similarly to the device described with reference to FIG. 2A, 2B, or 3. In some embodiments, the device 400 may be the device described with reference to FIGS. 1A-1B.

By way of example, the optoelectronic component 214 of the device 400 is a first optoelectronic component, and the device 400 may also include a second optoelectronic component 402. In various examples, the first and second optoelectronic components 214, 402 may be two optical emitters, two optical detectors, or an optical emitter and an optical detector (e.g., components of an optical transceiver).

In the device 400, the optical fiber 216 or optical fiber bundle 218 is a first optical fiber or first optical fiber bundle. The first optical fiber 216 or first optical fiber bundle 218 may route electromagnetic radiation to or from the first optoelectronic component 214.

A second optical fiber 404, or second optical fiber bundle 406 including the second optical fiber 404, may also be disposed in the interior cavity 210. The second optical fiber 404, or second optical fiber bundle 406, may extend between a first end 408 positioned adjacent the second optoelectronic component 402 (e.g., adjacent an optical port of the second optoelectronic component 402) and a second end 410 positioned adjacent the second housing component 208 (i.e., adjacent an optically-transmissive housing component). The second optical fiber 404 or second optical fiber bundle 406 may route electromagnetic radiation to or from the second optoelectronic component 402. The second optical fiber 404, and in some cases each optical fiber in the second optical fiber bundle 406, may define a non-linear optical path between the first end 408 and the second end 410. However, in contrast to the first optical fiber/fiber bundle, at least a portion of the second optical fiber 404, or second optical fiber bundle 406, may be laterally offset from a second lateral edge 412 of the display 204, opposite the first lateral edge 224 of the display 204, such that a portion of the display 204 is disposed between at least portions of the first and second optical fibers 216, 404 or first and second optical fiber bundles 218, 406. The at least portion of the second optical fiber 404, or second optical fiber bundle 406, may also be disposed between the second lateral edge 412 of the display 204 and the first housing component 206 (e.g., between the display 204 and a bezel that surrounds the display 204, in a gap 414).

The first and second optoelectronic components 214, 402 may have a first baseline separation 416. The first baseline separation 416 may be dictated by the sizes of the first and second optoelectronic components 214, 402, the configuration of a module, set of modules, or one or more substrates on which the first and second optoelectronic components 214, 402 are mounted, or other factors. The second ends 222, 410 of the first and second optical fibers 216, 404 or optical fiber bundles 218, 406 may have a second baseline separation 418, which second baseline separation 418 may be the same as, or different from (e.g., less than or greater than) the first baseline separation 416. However, typically, the second baseline separation 418 will be greater than the first baseline separation 416.

In alternative embodiments of the device 400, the first and second lateral edges 224, 412 of the display 204 need not be opposite edges of the display, but may be intersecting or perpendicular edges.

Figure 5A:
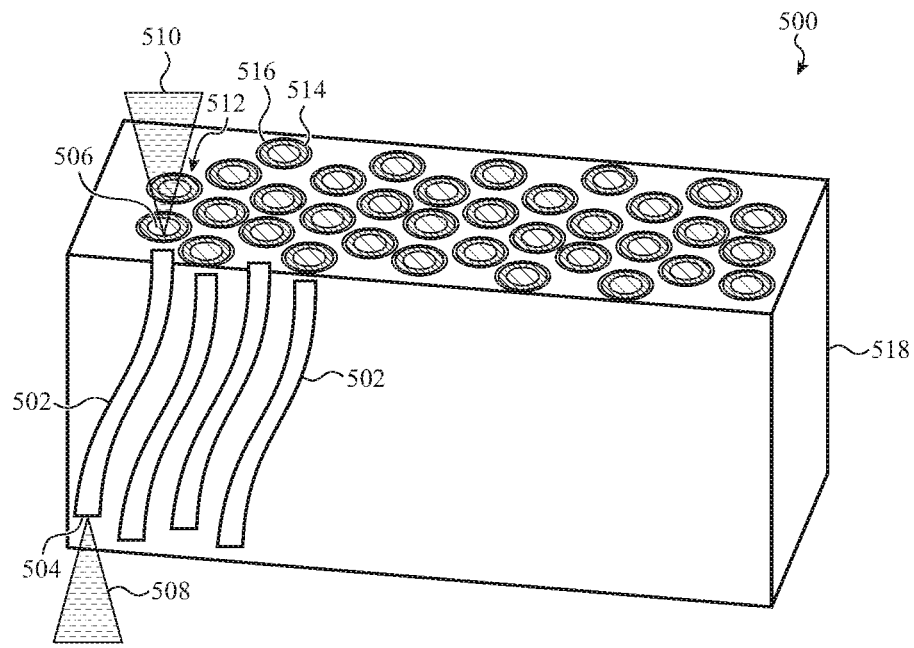
FIGS. 5A and 5B show various example configurations of optical fiber bundles.
Figure 5B:
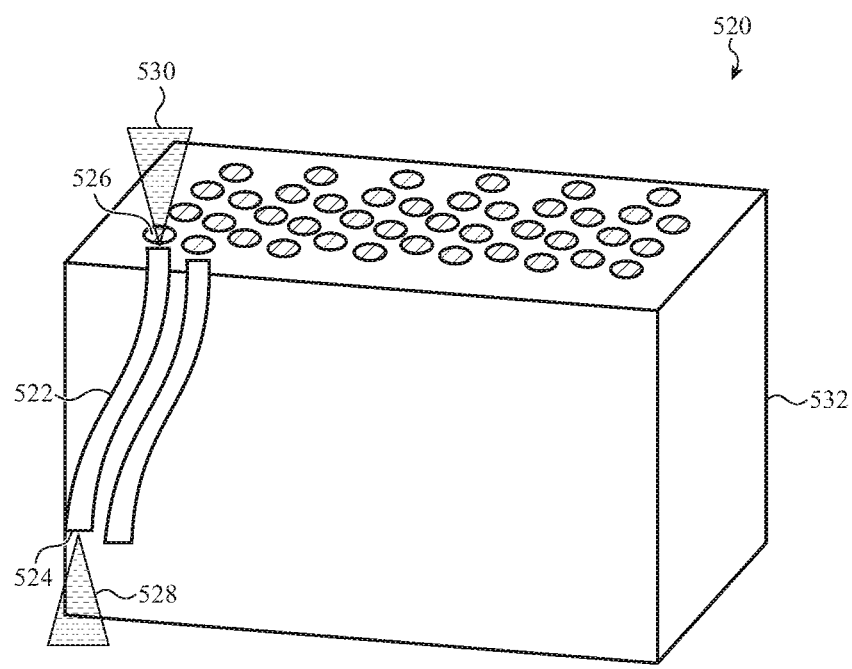

FIGS. 5A and 5B show various example configurations of optical fiber bundles. The techniques described with reference to these figures can also be applied to individual optical fibers.

FIG. 5A shows a first example configuration of an optical fiber bundle 500, which in some cases may be one of the fiber bundles described with reference to FIGS. 2A-4. By way of example, each optical fiber 502 in the bundle may have a first end 504 that may be positioned adjacent an optoelectronic component (e.g., adjacent an optical port of the optoelectronic component), and a second end 506 that may be positioned adjacent an optically-transmissive component (e.g., a cover over a display). Each optical fiber 502 may have a first FoV 508 adjacent the first end 504 (e.g., adjacent an optoelectronic component and/or in a device-internal environment adjacent the first end 504, and a second FoV 510 adjacent the second end 506 (e.g., in the optically-transmissive component and/or an ambient environment adjacent the optically-transmissive component).

Each optical fiber 502 may be surrounded, along its length, by one or more cladding layers 512. In some cases, an optical fiber 502 may have a high-index core, and the one or more cladding layers 512 may include a low-index cladding layer 514 that helps maintain total internal reflection (TIR) of electromagnetic radiation that propagates through the optical fiber 502. The one or more cladding layers 512 may also include an optional outer cladding or shielding layer 516 that absorbs electromagnetic radiation that escapes the low-index cladding layer 514. In some embodiments, the low-index cladding layer 514 may be made of glass, and the outer cladding layer 516 may made of a polymer. In some embodiments, the optical fiber's high-index core may be made of glass, and the low-index cladding layer 514 and/or outer cladding layer 516 may be made of polymers. The core and one or more cladding layers 512 may alternatively be made of glass, polymers, or other materials that help maintain TIR of electromagnetic radiation within the core, suppress optical loss and crosstalk, and so on.

A plurality of optical fibers 502 may be bundled by structures such as a bundling frame or strap, or may be encased by a lateral fill material 518. In some embodiments, the lateral fill material 518 may be a polymer.

Each of the one or more cladding layers 512, as well as the lateral fill material 518, may aid in suppressing fiber-to-fiber crosstalk. In some embodiments, the lateral fill material 518 may be air, and the optical fibers 502, with cladding, may be positioned adjacent each other. In some embodiments, some of the optical fibers 502 may be used to propagate electromagnetic radiation, and some optical fibers 502 may have their ends coated with an opaque ink or cladding, or may be opaque fibers, that function as the lateral fill material 518 and help to reduce crosstalk between the usable optical fibers.

In some embodiments, all of the optical fibers 502 in the optical fiber bundle 500 may be transmit fibers. Alternatively, all of the optical fibers 502 in the optical fiber bundle 500 may be receive fibers, or the optical fibers 502 in the optical fiber bundle 500 may include a combination of transmit fibers and receiver fibers.

In some cases, flexible optical fibers 502 in an optical fiber bundle 500 may be bent to a desired curvature during installation, to provide non-linear optical paths. Alternatively, flexible optical fibers 502 may be bent to a desired curvature individually or collectively, and maintained in their bent positions by a bundling frame, strap, or lateral fill material 518. It is also possible to flexibly or permanently change the individual or collective curvatures of fiber bundles via fusing and other processes. In other embodiments, flexible or semi-rigid optical fibers 502 may be manufactured (e.g., extruded) with a desired, fixed curvature.

The induced bending loss and fiber-to-fiber crosstalk is dependent on the curvature of the optical fibers 502, the core numerical aperture (NA) (e.g., the core-to-cladding refractive index contrast) for the optical fibers 502, the transverse beam quality, and so on.

In some embodiments, all of the optical fibers 502 may have the same diameter, NA, and curvature. In other embodiments, optical fibers 502 having different diameters, NAs, and/or curvatures may be bundled. In some embodiments, optical fibers may be tap fused into single optical fibers, for coupling and splitting purposes.

FIG. 5B shows a second example configuration of an optical fiber bundle 520, which in some cases may be one of the fiber bundles described with reference to FIGS. 2A-4. By way of example, each optical fiber 522 in the bundle may have a first end 524 that may be positioned adjacent an optoelectronic component (e.g., adjacent an optical port of the optoelectronic component), and a second end 526 that may be positioned adjacent an optically-transmissive component (e.g., a cover over a display). Each optical fiber 522 may have a first FoV 528 adjacent the first end 524 (e.g., adjacent an optoelectronic component and/or in a device-internal environment adjacent the first end 524, and a second FoV 530 adjacent the second end 526 (e.g., in the optically-transmissive component and/or an ambient environment adjacent the optically-transmissive component).

Each optical fiber 522 may have a high-index core surrounded, along its length, by a lateral fill material 532, such as a low-index, infrared (IR)-absorbing material.

In use, each of the optical fibers in the optical fiber bundles described herein, when positioned adjacent an optical emitter, may receive the same illumination, or different optical fibers may receive different illumination. For example, a single electromagnetic radiation source that produces flood illumination, or an array of electromagnetic radiation sources that, together, produce flood illumination, may emit electromagnetic radiation into a plurality of optical fibers in an optical fiber bundle. Alternatively, different electromagnetic radiation sources, or different subsets of electromagnetic radiation sources, may emit electromagnetic radiation into different optical fibers or different subsets of optical fibers in an optical fiber bundle.

Figure 6A:
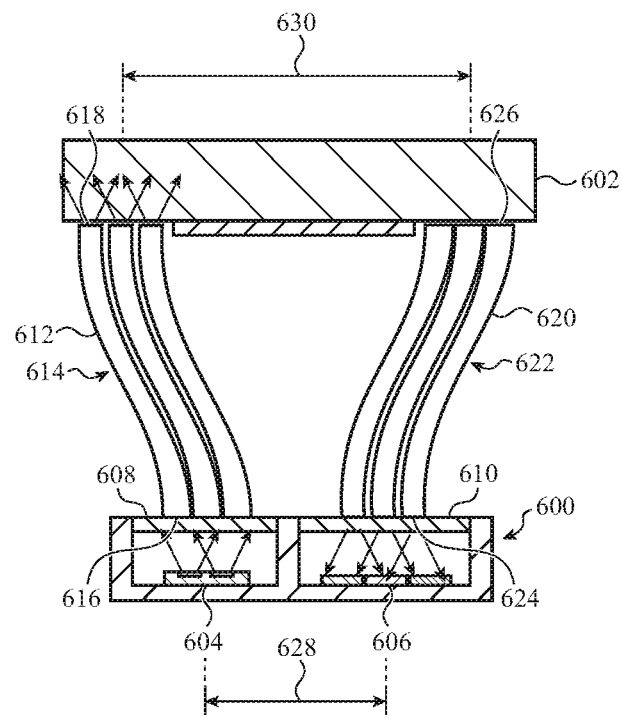
FIGS. 6A-6C show various examples of how optical fibers, or optical fiber bundles, may be used to change the baseline separation between two optoelectronic components.
Figure 6B:
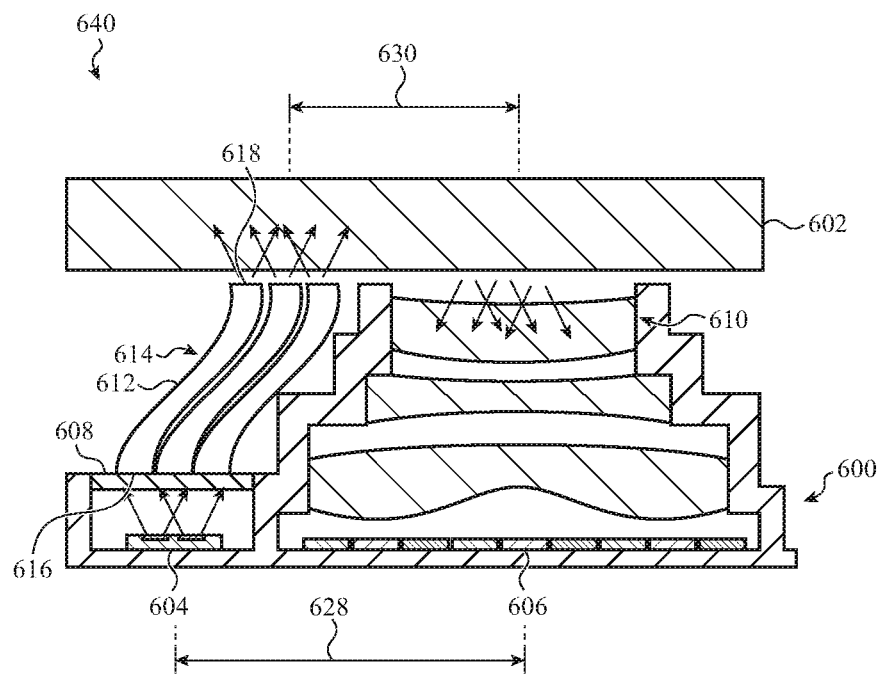
Figure 6C:
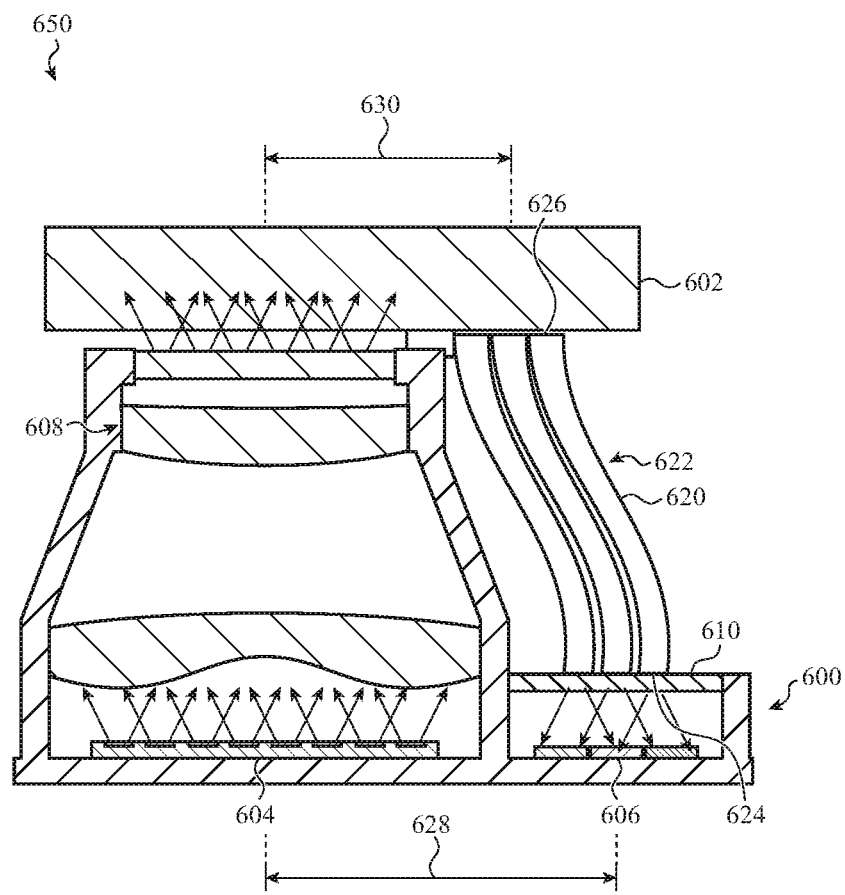

FIGS. 6A-6C show various examples of how optical fibers, or optical fiber bundles, may be used to change the baseline separation between two optoelectronic components. By way of example, the optoelectronic components are an optical emitter and an optical detector of an optical transceiver. However, the optoelectronic components may alternatively be two optical emitters or two optical detectors.

FIG. 6A shows an example optical transceiver 600 positioned in relation to an optically-transmissive housing component and/or surface 602. The optical transceiver 600 may in some cases be one of the optoelectronic components described with reference to FIGS. 2A-4.

The optical transceiver 600 may include an optical emitter 604 and an optical detector 606. The optical emitter 604 may include one or multiple electromagnetic radiation sources (e.g., one or multiple light-emitting diodes (LEDs) or lasers). The optical detector 606 may include one or multiple photosensitive elements (e.g., one or multiple photodetectors providing a proximity sensor, or an array of photodetectors providing a camera or depth sensor). In some embodiments, a set of one or more lenses 608 may be positioned in the optical emission path of the optical emitter 604 and/or a set of one or more lenses 610 may be positioned in the optical reception path of the optical detector 606. The lenses may provide beam-shaping or beam-directing, and may variously collimate, fan-out, or otherwise shape electromagnetic radiation that exits one or more optical fibers. Sets of lenses may also be positioned between the optical fibers and the optically-transmissive housing component, and may also be used for beam-shaping or beam-directing. In some cases, optical filters may be used in combination with the lenses (or independently of the lenses).

A first optical fiber 612 or first optical fiber bundle 614 may have a first end 616 adjacent the optical emitter 604 (or optical port of the optical emitter 604) or set of one or more lenses 608, and a second end 618 adjacent the optically-transmissive housing component 602. A second optical fiber 620 or second optical fiber bundle 622 may have a first end 624 adjacent the optical detector 606 (or optical port of the optical detector 606) or set of one or more lenses 610, and a second end 626 adjacent the optically-transmissive housing component 602.

The optical emitter 604 and optical detector 606 may have a first baseline separation 628. The second ends 618, 626 of the first and second optical fibers 612, 620 or optical fiber bundles 614, 622 may have a second baseline separation 630, which second baseline separation 630 may be the same as, or different from (e.g., less than or greater than), the first baseline separation 628. In some embodiments, the second ends 618, 626 of the optical fibers 612, 620 or optical fiber bundles 614, 622 may be separated by a light-blocking element; a light-absorbing element; a light-reflecting element; a light-blocking, light-absorbing, or light-reflecting ink; a display; and so on. The optical fibers 612, 620 or optical fiber bundles 614, 622 allow the second baseline separation 630 between the second ends 618, 626 to be configured for a sensing resolution, crosstalk reduction, and so on, independently of the first baseline separation 628.

FIG. 6B shows an example alternative configuration 640 of the optical transceiver 600 described with reference to FIG. 6A. In the alternative configuration 640, the optical detector 606 has a wider footprint, and the set of one or more lenses 610 includes a pyramidal stack of lenses. The pyramidal stack of lenses may extend to near the optically-transmissive housing component 602, and thus the second optical fiber 620 or second optical fiber bundle 622 may not be needed.

This wider footprint of the optical detector 606 may increase the first baseline separation 628 between the optical emitter 604 and optical detector 606. To decrease the effective baseline separation between the optical emitter 604 and optical detector 606, the first optical fiber 612 or first optical fiber bundle 614 may pipe electromagnetic radiation emitted by the optical emitter 604 closer to an area of the optically-transmissive housing component 602 where electromagnetic radiation that ultimately propagates to the optical detector 606 is received through the optically-transmissive housing component 602, thereby decreasing the second baseline separation 630.

In some cases, the optical detector 606 shown in FIG. 6B may be a camera or image sensor, and the first optical fiber 612 or first optical fiber bundle 614 may be routed through an aperture created for the camera.

FIG. 6C shows an example alternative configuration 650 of the optical transceiver 600 described with reference to FIG. 6A. In the alternative configuration 650, the optical emitter 604 has a wider footprint, and the set of one or more lenses 608 includes a pyramidal stack of lenses. The pyramidal stack of lenses may extend to near the optically-transmissive housing component 602, and thus the first optical fiber 612 or first optical fiber bundle 614 is not needed.

This wider footprint of the optical emitter 604 may increase the first baseline separation 628 between the optical emitter 604 and optical detector 606. To decrease the effective baseline separation between the optical emitter 604 and optical detector 606, the second optical fiber 620 or second optical fiber bundle 622 may collect electromagnetic radiation received through the optically-transmissive housing component 602 from closer to where electromagnetic radiation emitted by the optical emitter 604 passes through the optically-transmissive housing component 602, thereby decreasing the second baseline separation 630.

In general, a greater second baseline separation in each of FIGS. 6A-6C can reduce crosstalk between an optical emitter and an optical detector. A greater baseline separation can also improve sensing applications in which emitted electromagnetic radiation needs to travel through a medium before being sensed (e.g., in the case of a heart rate sensor). A greater second baseline separation can also improve stereo vision for two optical detectors. A lesser second baseline separation can be advantageous in that it can minimize the surface area needed on an optically-transmissive component or surface. A lesser second baseline separation can also minimize the sensing blind zone close to the optically-transmissive housing component 602, which sensing blind zone is created by the optical emitter/detector FoVs and baseline separation.

In some cases, it may be useful to multiplex, split, or couple optical paths. Various such scenarios are described with reference to FIGS. 7A-7D.

Figure 7A:
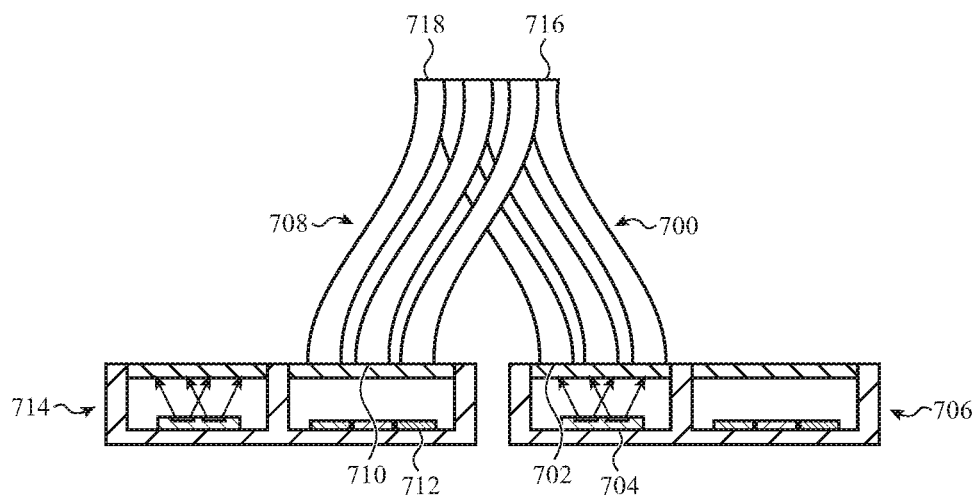
FIG. 7A shows an example of spatially multiplexed transmit and receive optical paths.

FIG. 7A shows an example of spatially multiplexed transmit and receive optical paths. A first optical fiber bundle 700 has a first end 702 positioned adjacent an optical emitter 704 of a first optical transceiver 706, and a second optical fiber bundle 708 has a first end 710 positioned adjacent an optical detector 712 of a second optical transceiver 714.

If the optical emitter 704 and optical detector 712 are enabled at different times, or if the optical emitter 704 and optical detector 712 emit/detect different wavelengths of electromagnetic radiation, or in various other scenarios, the second ends 716, 718 of the optical fiber bundles 700, 708 may be interspersed or coupled (e.g., fused). In the case of interspersion, the optical fibers of one optical fiber bundle may help reduce crosstalk when the optical fibers of the other optical fiber bundle are in use. In the case of coupling, the same set of ports may be used to emit and receive electromagnetic radiation (e.g., optical fibers in each optical fiber bundle 700, 708 may be coupled in a pair-wise manner). When the optical detector 712 detects different wavelengths of electromagnetic radiation than the optical emitter 704 emits, or when the optical detector 712 is used to monitor an output of the optical emitter 704, for example, the first and second optical fiber bundles 700, 708 may be used by the optical emitter 704 and optical detector 712 at the same time.

Figure 7B:
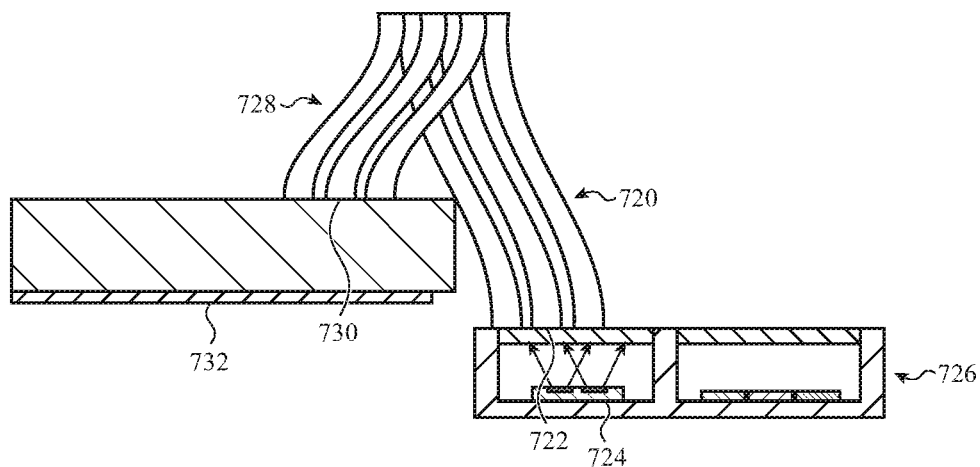
FIG. 7B shows an example of spatially multiplexed transmit optical paths.

FIG. 7B shows an example of spatially multiplexed transmit optical paths. A first optical fiber bundle 720 has a first end 722 positioned adjacent an optical emitter 724 of an optical transceiver 726, and a second optical fiber bundle 728 has a first end 730 positioned adjacent a portion of a display 732.

The second ends of the optical fibers in the first and second optical fiber bundles 720, 728 may be interspersed, or coupled (e.g., fused) such that the optical fibers in the first and second optical fiber bundles 720, 728 share a same set of optical ports. In some embodiments, the optical emitter 724 may emit at a different wavelength than the display 732. In some embodiments, the optical emitter 724 may emit at a same wavelength as some of the pixels of the display 732. In some embodiments, the optical emitter 724 and display 732 may emit at the same time. In other embodiments, the optical emitter 724 and display 732 may emit at different times. For example, the optical emitter 724 may emit during a refresh period of the display 732.

Although the optical transceiver 726 is shown offset from the display 732 in FIG. 7B, the optical transceiver 726 may alternatively be partially or wholly positioned under the display 732 in some embodiments.

Figure 7C:
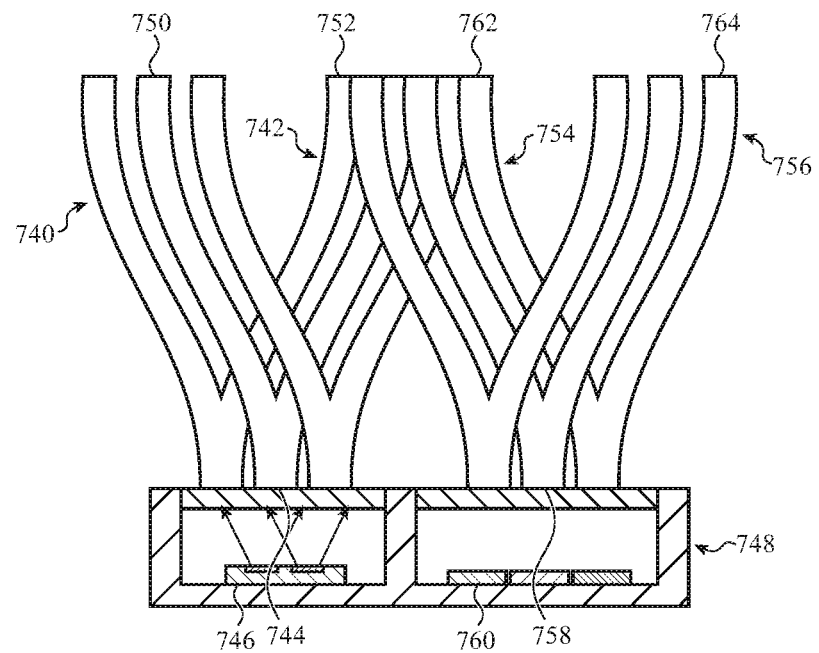
FIG. 7C shows an example of split transmit and receive optical paths.

FIG. 7C shows an example of split transmit and receive optical paths. First and second optical fiber bundles 740, 742 share a set of first ends 744 positioned adjacent an optical emitter 746 of an optical transceiver 748, but have separate second ends 750, 752 disposed at different locations (e.g., different areas of an optically-transmissive housing component or surface). Similarly, third and fourth optical fiber bundles 754, 756 share a set of first ends 758 positioned adjacent an optical detector 760 of the optical transceiver 748, but have separate second ends 762, 764 disposed at different locations. In some embodiments, the second ends 762, 764 of the second and third optical fiber bundles may be interspersed or coupled (e.g., fused), but they need not be.

In use, the optical emitter 746 may emit electromagnetic radiation into the optical fibers of the first and second optical fiber bundles 740, 742 simultaneously, or an optical path routing controller, such as an optical switch, isolator, or circulator, may be used to enable emission through the optical fibers of the first optical fiber bundle 740 or the second optical fiber bundle 742. Similarly, the optical detector 760 may receive electromagnetic radiation through the optical fibers of the third and fourth optical fiber bundles 754, 756 simultaneously, or an optical path routing controller may be used to enable reception through the optical fibers of the third optical fiber bundle 754 or the fourth optical fiber bundle 756. In some examples, an optical path routing controller may selectively alter a propagation of electromagnetic radiation through an optical fiber, optical fiber bundle, or set of one or more optical paths. In some examples, an optical path routing controller may selectively block or allow the propagation of electromagnetic radiation through an optical fiber, optical fiber bundle, or set of one or more optical paths.

When one or more optical path routing controllers are used, the first through fourth optical fiber bundles 740, 742, 754, 756 may provide four sensing channels. In some cases, the sensing channel formed between the second and third optical fiber bundles may be used for proximity detection or imaging. In some cases, the sensing channel formed between the first and fourth optical fiber bundles 740, 756 may be used for stereo vision. In some cases, the sensing channel formed between the first and third optical fiber bundles 740, 754, or the sensing channel formed between the second and fourth optical fiber bundles 742, 756, and/or the sensing channel formed between the second and third optical fiber bundles 742, 754 may be used for calibration, spatial information, or tracking purposes. The various sensing channels may also be used for other purposes.

Figure 7D:
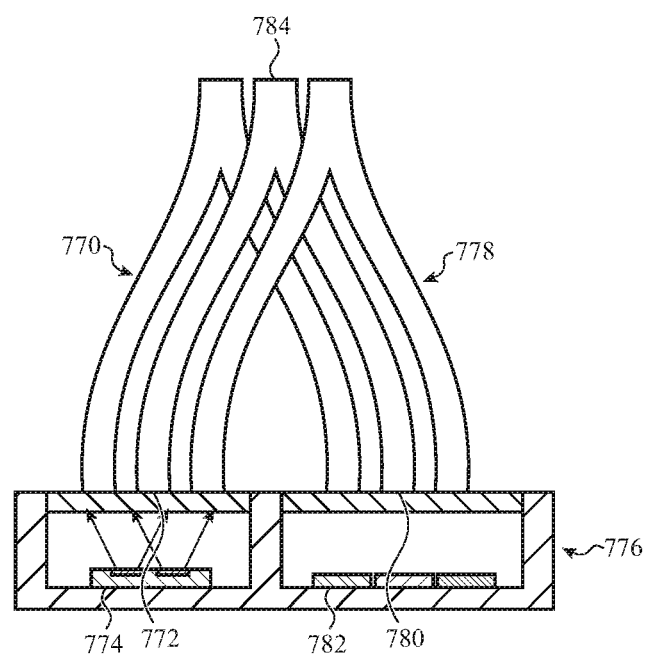
FIG. 7D shows an example of coupled transmit and receive optical paths.

FIG. 7D shows an example of coupled transmit and receive optical paths. A first optical fiber bundle 770 has a first end 772 positioned adjacent an optical emitter 774 of an optical transceiver 776, and a second optical fiber bundle 778 has a first end 780 positioned adjacent an optical detector 782 of the optical transceiver 776. The first and second optical fiber bundles 770, 778 are coupled fused or otherwise coupled at a second set of ends, to provide a set of shared optical ports 784.

In use, the optical emitter 774 and optical detector 782 may be operated at the same or different times. When operated at the same time, the optical detector 782 may in some cases receive a portion of the electromagnetic radiation emitted by the optical emitter 774 as a back-reflection from the optical ports 784. In such cases, the output of the optical detector 782 may be gated or filtered to ignore the back-reflection, or the back-reflection may be used for calibration or other purposes. It is also possible to employ non-reciprocal elements, such as an inline isolator and circulator, to mitigate or avoid the back-reflections.

FIGS. 8A-8E show various scenarios in which flexible optical fibers or optical fiber bundles may be repositioned (e.g., moved) by an optical path routing controller that selectively alters a set of one or more routes of a set of one or more optical paths defined by an optical fiber or optical fiber bundle. The route alteration may be used for purposes such as beam steering, adaptive baselining, channel switching, and/or beam shaping.

Figure 8A:
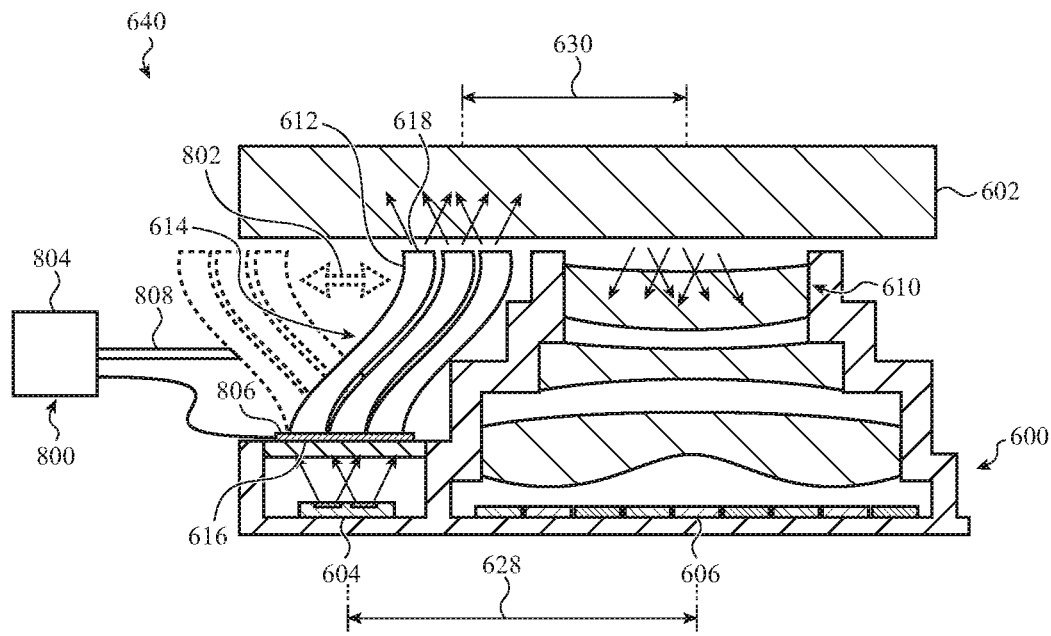
FIGS. 8A-8E show various scenarios in which flexible optical fibers or optical fiber bundles may be repositioned (e.g., moved) by an optical path routing controller that selectively alters a set of one or more routes of a set of one or more optical paths defined by an optical fiber or optical fiber bundle.

FIG. 8A shows a first example use of an optical path routing controller, in conjunction with the optical transceiver 600 described with reference to FIG. 6B. As shown, the optical path routing controller 800 may selectively reposition the second end 618 of the first optical fiber 612 or optical fiber bundle 614 between a first position and a second position, or to intermediate positions therebetween, as denoted by the arrow 802.

In some embodiments, the optical path routing controller 800 may include a microelectromechanical system (MEMS), a piezoelectric actuator, a shape-memory alloy (SMA) actuator, or a voice coil motor (VCM) actuator. The optical path routing controller 800 may include a processor or other controller 804 that actuates an actuator component 806 (e.g., a MEMS, piezo, SMA, or VCM) that attaches the optical fiber 612 or optical fiber bundle 614 to an optical port of the optical emitter 604, or alternatively actuates an actuator component 808 (e.g., a MEMS, piezo, SMA, or VCM) that pushes or pulls the optical fiber 612 or optical fiber bundle 614 along its length.

Repositioning the optical fiber 612 or optical fiber bundle 614 changes the second baseline separation 630 (i.e., the effective baseline separation) between the optical emitter 604 and the optical detector 606.

Figure 8B:
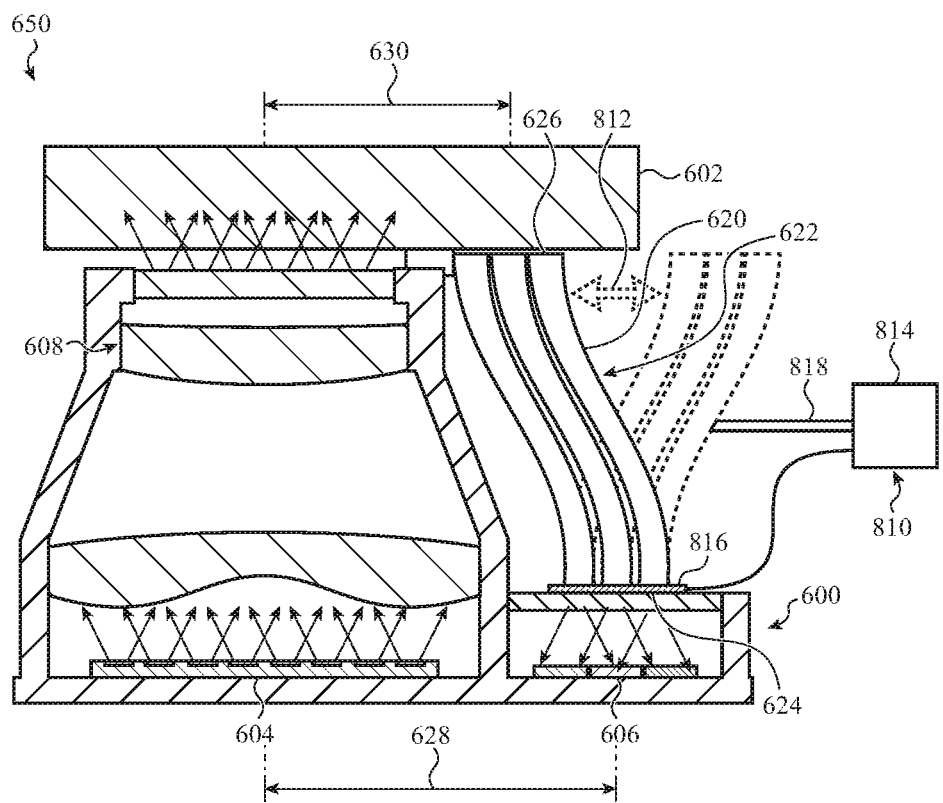

FIG. 8B shows a second example use of an optical path routing controller, in conjunction with the optical transceiver 600 described with reference to FIG. 6C. As shown, the optical path routing controller 810 may selectively reposition the second end 626 of the first optical fiber 620 or optical fiber bundle 622 between a first position and a second position, or to intermediate positions therebetween, as denoted by the arrow 812.

The optical path routing controller 810 may be configured similarly to the optical path routing controller described with reference to FIG. 8A, and may include a processor or other controller 814 that actuates an actuator component 816 (e.g., a MEMS, piezo, SMA, or VCM) that attaches the optical fiber 620 or optical fiber bundle 622 to an optical port of the optical detector 606, or alternatively actuates an actuator component 818 (e.g., a MEMS, piezo, SMA, or VCM) that pushes or pulls the optical fiber 620 or optical fiber bundle 622 along its length.

Figure 8C:
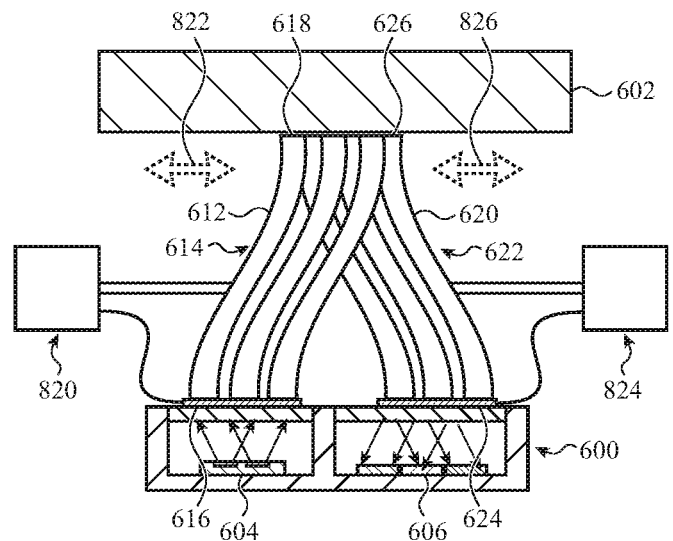

FIG. 8C shows a third example use of an optical path routing controller, in conjunction with the optical transceiver 600 described with reference to FIG. 6A. As shown, a first optical path routing controller 820 may selectively reposition the second end 618 of the first optical fiber 612 or optical fiber bundle 614 between a first position and a second position, or to intermediate positions therebetween, as denoted by the arrow 822. Similarly, a second optical path routing controller 824 may selectively reposition the second end 626 of the first optical fiber 620 or optical fiber bundle 622 between a first position and a second position, or to intermediate positions therebetween, as denoted by the arrow 826. The first and second optical path routing controllers 820, 824 may be configured as described with reference to FIGS. 8A-8B. The arrangement shown in FIG. 8C can provide a wider range of effective baseline separations for the optical emitter 604 and optical detector 606.

Figure 8D:
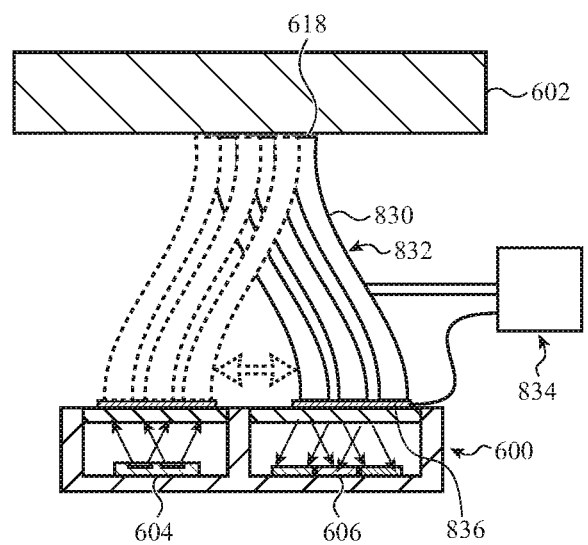

FIG. 8D shows a fourth example use of an optical path routing controller, in conjunction with the optical transceiver 600 described with reference to FIG. 6A. However, in FIG. 8D, only a single optical fiber 830 or optical fiber bundle 832 is used, and is maintained (e.g., attached or mounted) in a fixed position with respect to the optically-transmissive housing component 602. An optical path routing controller 834 is then used to multiplex use of the optical fiber 830 or optical fiber bundle 832 between the optical emitter 604 and optical detector 606, by moving an end 836 of the optical fiber 830 or optical fiber bundle 832 between an optical port of the optical emitter 604 and an optical port of the optical detector 606. In an effect, the optical path routing controller 834 may be used to switch use of the optical fiber 830 or optical fiber bundle 832 between an emission channel and a detection channel.

Figure 8E:
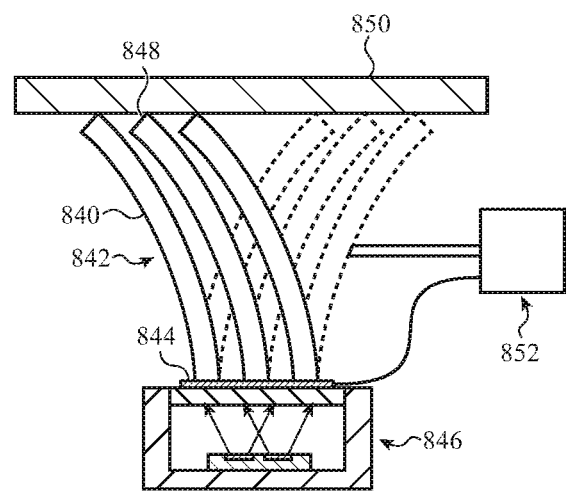

FIG. 8E shows a fifth example use of an optical path routing controller. In FIG. 8E, an optical fiber 840 or optical fiber bundle 842 has a first end 844 positioned adjacent an optoelectronic component 846, and a second end 848 positioned adjacent an optically-transmissive component or surface 850. An optical path routing controller 852 is configured to reposition the optical fiber 840 or optical fiber bundle 842 such that the second end 848 changes its orientation with respect to the optically-transmissive component or surface 850. For example, the second end may be repositioned to tilt left, tilt right, or assume other orientations (e.g., an orientation parallel to the optically-transmissive component or surface 850). In this manner, the angle of the optical fiber's or optical fiber bundle's FoV may be changed, and a potentially wider FoV may be scanned in an angular space.

Figure 9:
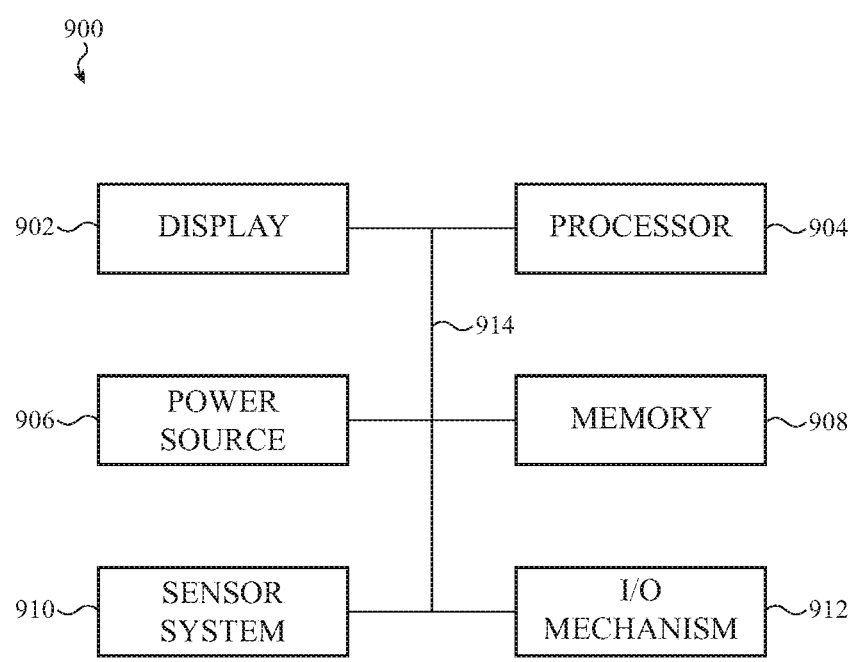
FIG. 9 shows an example electrical block diagram of an electronic device.

FIG. 9 shows a sample electrical block diagram of an electronic device 900, which electronic device may in some cases take the form of the device described with reference to FIGS. 1A and 1B and/or have a display stack or under-display optical emitter or transceiver as described with reference to FIGS. 1A-8E. The electronic device 900 may include a display 902 (e.g., a light-emitting display), a processor 904, a power source 906, a memory 908 or storage device, a sensor system 910, or an input/output (I/O) mechanism 912 (e.g., an input/output device, input/output port, or haptic input/output interface). The processor 904 may control some or all of the operations of the electronic device 900. The processor 904 may communicate, either directly or indirectly, with some or all of the other components of the electronic device 900. For example, a system bus or other communication mechanism 914 can provide communication between the display 902, the processor 904, the power source 906, the memory 908, the sensor system 910, and the I/O mechanism 912.

The processor 904 may be implemented as any electronic device capable of processing, receiving, or transmitting data or instructions, whether such data or instructions are in the form of software or firmware or otherwise encoded. For example, the processor 904 may include a microprocessor, a central processing unit (CPU), an ASIC, a digital signal processor (DSP), a controller, or a combination of such devices. As described herein, the term "processor" is meant to encompass a single processor or processing unit, multiple processors, multiple processing units, or other suitably configured computing element or elements.

It should be noted that the components of the electronic device 900 can be controlled by multiple processors. For example, select components of the electronic device 900 (e.g., the sensor system 910) may be controlled by a first processor and other components of the electronic device 900 (e.g., the display 902) may be controlled by a second processor, where the first and second processors may or may not be in communication with each other.

The power source 906 can be implemented with any device capable of providing energy to the electronic device 900. For example, the power source 906 may include one or more batteries or rechargeable batteries. Additionally or alternatively, the power source 906 may include a power connector or power cord that connects the electronic device 900 to another power source, such as a wall outlet.

The memory 908 may store electronic data that can be used by the electronic device 900. For example, the memory 908 may store electrical data or content such as, for example, audio and video files, documents and applications, device settings and user preferences, timing signals, control signals, and data structures or databases. The memory 908 may include any type of memory. By way of example only, the memory 908 may include random access memory, read-only memory, Flash memory, removable memory, other types of storage elements, or combinations of such memory types.

The electronic device 900 may also include one or more sensor systems 910 positioned almost anywhere on the electronic device 900. However, at least one optical transceiver may be positioned under the display 902, and may be configured to transmit and receive light through the display 902. The sensor system(s) 910 may be configured to sense one or more types of parameters, such as but not limited to, light; touch; force; heat; movement; relative motion; biometric data (e.g., biological parameters) of a user; proximity of an object; depth of an object; and so on. By way of example, the sensor system(s) 910 may include a heat sensor, a position sensor, a light or optical sensor (e.g., an optical transceiver), an accelerometer, a pressure transducer, a gyroscope, a magnetometer, a health monitoring sensor, and so on. Additionally, the one or more sensor systems 910 may utilize any suitable sensing technology, including, but not limited to, capacitive, ultrasonic, resistive, optical, ultrasound, piezoelectric, and thermal sensing technology.

The I/O mechanism 912 may transmit or receive data from a user or another electronic device. The I/O mechanism 912 may include the display 902, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 912 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

As described above, one aspect of the present technology may be the gathering and use of data available from various sources, including biometric data (e.g., the presence and/or proximity of a user to a device, a user's fingerprint or face map, and so on). The present disclosure contemplates that, in some instances, this gathered data may include personal information data that uniquely identifies or can be used to identify, locate, or contact a specific person. Such personal information data can include demographic data, location-based data, telephone numbers, email addresses, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to activate or deactivate various functions of the user's device, or gather performance metrics for the user's device or the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. An electronic device, comprising:
a housing defining an interior cavity and including an optically-transmissive housing component;
a display disposed in the interior cavity and viewable through the optically-transmissive housing component;
an optoelectronic component disposed in the interior cavity; and
an optical fiber extending between a first end positioned adjacent the optoelectronic component and a second end positioned adjacent the optically-transmissive housing component; wherein,
the optical fiber defines a non-linear optical path between the first end and the second end; and
at least a portion of the optical fiber is laterally offset from a lateral edge of the display.

2. The electronic device of claim 1, further comprising:
a display stack including the display; wherein,
a substrate of the display stack extends at least partly between the optoelectronic component and the optically-transmissive housing component.

3. The electronic device of claim 2, wherein:
the housing includes a bezel;
the optically-transmissive housing component is attached to the bezel; and
the at least portion of the optical fiber is disposed between the lateral edge of the display and the bezel.

4. The electronic device of claim 1, wherein the optoelectronic component comprises an optical detector.

5. The electronic device of claim 1, wherein the optoelectronic component comprises an optical emitter.

6. The electronic device of claim 1, wherein:
the optical fiber is a first optical fiber;
the optoelectronic component is an optical transceiver comprising an optical emitter and an optical detector;
the first optical fiber routes electromagnetic radiation emitted by the optical emitter to the optically-transmissive housing component;
the electronic device further comprises a second optical fiber extending between a first end positioned adjacent the optical detector and a second end positioned adjacent the optically-transmissive housing component;
the optical emitter and the optical detector have a first baseline separation; and
the second end of the first optical fiber and the second end of the second optical fiber have a second baseline separation, different from the first baseline separation.

7. The electronic device of claim 6, wherein:
the housing includes a bezel;
the optically-transmissive housing component is supported by the bezel;
the portion of the first optical fiber is positioned between the lateral edge of the display and the bezel; and
at least a portion of the second optical fiber is positioned between the lateral edge of the display and the bezel.

8. The electronic device of claim 6, wherein:
the lateral edge of the display is a first lateral edge of the display;
the display comprises a second lateral edge, different from the first lateral edge; and
at least a portion of the second optical fiber is laterally offset from the second lateral edge of the display; wherein,
a portion of the display is disposed between the at least portion of the first optical fiber and the at least portion of the second optical fiber.

9. The electronic device of claim 1, wherein the positions of the first end of the optical fiber and the second end of the optical fiber are non-line-of-sight positions.

10. An electronic device, comprising:
a housing defining an interior cavity and including an optically-transmissive housing component;
a display disposed within the interior cavity and viewable through the optically- transmissive housing component;
a first optoelectronic component disposed within the interior cavity;
a first optical fiber bundle extending between the first optoelectronic component and the optically-transmissive housing component;
a second optoelectronic component disposed within the interior cavity; and
a second optical fiber bundle extending between the first optoelectronic component and the optically-transmissive housing component; wherein,
a first set of optical fiber ends in the first optical fiber bundle is spatially multiplexed with a second set of optical fiber ends in the second optical fiber bundle.

11. The electronic device of claim 10, wherein the first set of optical fiber ends is interspersed with the second set of optical fiber ends.

12. The electronic device of claim 10, wherein the first set of optical fiber ends is optically coupled to the second set of optical fiber ends.

13. An electronic device, comprising:
an enclosure having an optically-transmissive surface;
an optoelectronic component housed within the enclosure;

an optical fiber bundle housed within the enclosure and configured to route electromagnetic radiation between the optoelectronic component and the optically-transmissive surface; and an optical path routing controller configured to selectively alter a set of one or more routes of a set of one or more optical paths defined by the optical fiber bundle, the optical path routing controller configured to selectively reposition at least one of a first end or a second end of the optical fiber bundle.

14. The electronic device of claim 13, wherein the optical path routing controller comprises a piezoelectric actuator in mechanical communication with the optical fiber bundle.

15. The electronic device of claim 13, wherein:
the optoelectronic component is an optical transceiver comprising an optical emitter and an optical detector;
the first end of the optical fiber bundle is positioned adjacent the optical transceiver;
the second end of the optical fiber bundle is positioned adjacent the optically- transmissive surface; and
the optical path routing controller is configured to selectively reposition the second end of the optical fiber bundle and change a baseline between the optical emitter and the optical detector.

16. The electronic device of claim 13, wherein the optical path routing controller is configured to selectively alter a propagation of electromagnetic radiation through the set of one or more optical paths.

17. The electronic device of claim 16, wherein the optical path routing controller comprises an optical switch.

18. The electronic device of claim 16, wherein the optical path routing controller is configured to selectively block or allow the propagation of electromagnetic radiation through the set of one or more optical paths.

19. The electronic device of claim 13, further comprising:
a display housed within the enclosure and having a lateral edge; wherein,
at least a portion of the optical fiber bundle is positioned laterally adjacent the lateral edge of the display.

* * * * *